(12) United States Patent
Yamaguchi

(10) Patent No.: US 11,716,099 B2
(45) Date of Patent: Aug. 1, 2023

(54) RADIO FREQUENCY MODULE AND COMMUNICATION DEVICE

(71) Applicant: Murata Manufacturing Co., Ltd., Nagaokakyo (JP)

(72) Inventor: Yukiya Yamaguchi, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 109 days.

(21) Appl. No.: 17/392,300

(22) Filed: Aug. 3, 2021

(65) Prior Publication Data

US 2021/0367627 A1 Nov. 25, 2021

Related U.S. Application Data

(63) Continuation of application No. PCT/JP2020/018547, filed on May 7, 2020.

(30) Foreign Application Priority Data

Jun. 25, 2019 (JP) ................... 2019-117601

(51) Int. Cl.
*H04B 1/00* (2006.01)
*H04B 1/10* (2006.01)
*H04B 1/16* (2006.01)

(52) U.S. Cl.
CPC ................... *H04B 1/0057* (2013.01)

(58) Field of Classification Search
CPC .... H04B 1/0057; H04B 1/006; H04B 1/0067; H04B 1/06; H04B 1/16; H04B 1/18;
(Continued)

(56) References Cited

U.S. PATENT DOCUMENTS

| | | | |
|---|---|---|---|
| 6,973,330 B2* | 12/2005 | Wieck ...................... | H04B 1/40 455/558 |
| 8,838,058 B2* | 9/2014 | Vogas ...................... | H04B 1/40 455/313 |

(Continued)

FOREIGN PATENT DOCUMENTS

| | | |
|---|---|---|
| JP | 2005-79885 A | 3/2005 |
| JP | 2006-135027 A | 5/2006 |

(Continued)

OTHER PUBLICATIONS

Office Action dated Sep. 5, 2022 in Chinese Patent Application No. 202080046291.1, 6 pages.

(Continued)

*Primary Examiner* — Quochien B Vuong
(74) *Attorney, Agent, or Firm* — Xsensus LLP

(57) ABSTRACT

A radio frequency module and a communication device capable of reducing a mounting substrate size. The radio frequency module includes a mounting substrate, a first filter, and a second filter. The mounting substrate has a first main surface and a second main surface that are on opposite sides of the mounting substrate. The first filter is provided on the first main surface and allows a first receiving signal in a first frequency band to pass through. The second filter is stacked on the first filter and allows a second receiving signal in a second frequency band different from the first frequency band to pass through.

18 Claims, 8 Drawing Sheets

(58) Field of Classification Search
CPC ...... H04B 1/38; H04B 1/3827; H04B 1/3833; H04B 1/40
See application file for complete search history.

(56) References Cited

U.S. PATENT DOCUMENTS

| | | | | |
|---|---|---|---|---|
| 9,660,614 | B2* | 5/2017 | Reid | H01P 1/202 |
| 10,515,924 | B2* | 12/2019 | Babcock | H04B 1/40 |
| 10,535,909 | B2* | 1/2020 | Huang | H05K 1/16 |
| 10,594,355 | B2* | 3/2020 | Young | H04B 1/40 |
| 10,903,819 | B2* | 1/2021 | Kuroyanagi | H04B 11/00 |
| 2007/0080757 | A1 | 4/2007 | Yahata et al. | |

FOREIGN PATENT DOCUMENTS

| | | |
|---|---|---|
| KR | 10-2019-0040041 A | 4/2019 |
| WO | 2012/036134 A1 | 3/2012 |
| WO | 2018/168500 A1 | 9/2018 |
| WO | 2019/065311 A1 | 4/2019 |

OTHER PUBLICATIONS

Office Action dated Oct. 15, 2022 in Korean Patent Application No. 10-2021-7037316, 5 pages.
International Search Report and Written Opinion dated Jul. 21, 2020, received for PCT Application PCT/JP2020/018547, Filed on May 7, 2020, 8 pages including English Translation.

* cited by examiner

RADIO FREQUENCY MODULE AND COMMUNICATION DEVICE

CROSS-REFERENCE TO RELATED APPLICATIONS

The present application is a continuation of and claims priority to PCT/JP2020/018547, filed May 7, 2020, which claims priority to JP 2019-117601, filed Jun. 25, 2019, the entire contents of each are incorporated herein by its reference.

TECHNICAL FIELD

The present disclosure generally relates to a radio frequency module and a communication device, and in more detail, to a radio frequency module including a plurality of filters and a communication device including the radio frequency module.

BACKGROUND ART

A front-end module (radio frequency module) disposed in a front-end unit of a multimode/multiband mobile phone (see Patent Document 1, for example) has been known.

The front-end module described in Patent Document 1 includes a filter block and an amplifier block. The filter block includes a plurality of filters constituted by a surface acoustic wave resonator, a bulk acoustic wave resonator, an FBAR, or the like. The amplifier block includes a plurality of amplifier circuits. Each of the plurality of amplifier circuits is a low-noise amplifier, for example.

A first filter being one of the plurality of filters is a triplexer in which input terminals of three filters are formed into a common terminal, for example. A second filter being one of the plurality of filters is a duplexer in which input terminals of two filters are formed into a common terminal, for example.

One of the three filters constituting the first filter and one of the two filters constituting the second filter are connected to one of the plurality of low-noise amplifiers, for example.

CITATION LIST

Patent Document

Patent Document 1: International Publication No. 2019/065311

SUMMARY

Technical Problem

Two filters are connected to the same low-noise amplifier in the front-end module described in Patent Document 1. This configuration results in a problem that some arrangement of the two filters may cause a mounting substrate to increase in size.

An object of the present disclosure is to provide a radio frequency module and a communication device capable of reducing the mounting substrate in size.

Solution to Problem

A radio frequency module according to an aspect of the present disclosure includes a mounting substrate, a first filter, a second filter, and a low-noise amplifier. The mounting substrate has a first main surface and a second main surface that are on opposite sides of the mounting substrate. The first filter is provided on the first main surface and allows a first receiving signal in a first frequency band to pass through. The second filter is stacked on the first filter and allows a second receiving signal in a second frequency band different from the first frequency band to pass through. The low-noise amplifier is connected to the first filter and the second filter and is provided on the first main surface or on the second main surface.

A communication device according to an aspect of the present invention includes the radio frequency module and a signal processing circuit. The signal processing circuit processes the first receiving signal and the second receiving signal.

Advantageous Effects

Employing the radio frequency module and the communication device according to the above aspect of the present disclosure achieves an effect of reducing a mounting substrate in size.

DESCRIPTION OF EMBODIMENTS

FIG. 1, FIG. 3, FIG. 4, FIG. 5, FIG. 6, FIG. 7, and FIG. 8 that are referred to in Embodiment 1 and the like below are all schematic views, and the ratios of the size and thickness of each constituent element in the figures do not necessarily reflect the actual dimensional ratios.

Embodiment 1

Hereinafter, a radio frequency module 1 and a communication device 200 according to Embodiment 1 will be described with reference to FIG. 1 to FIG. 3.

(1) Overall Configuration of Radio Frequency Module

The radio frequency module 1 according to the present embodiment is used in the multimode/multiband communication device 200 (see FIG. 2), for example. The communication device 200 is, for example, a mobile phone (a smartphone, for example) but is not limited thereto, and may be a wearable terminal (a smartwatch, for example) or the like, for example.

The radio frequency module 1 is provided in the multi-band communication device 200 compliant with a communication standard such as long term evolution (LTE), for example. The radio frequency module 1 is configured to be able to support Carrier Aggregation. The radio frequency module 1 performs simultaneous communication in a plurality of frequency bands in the present embodiment. Specifically, the radio frequency module 1 receives a transmitted wave in which radio waves (carriers) in a plurality of frequency bands are bundled and transmitted. Note that the radio frequency module 1 may be configured to be able to support not only Carrier Aggregation but also Dual Connectivity.

Figure 1:
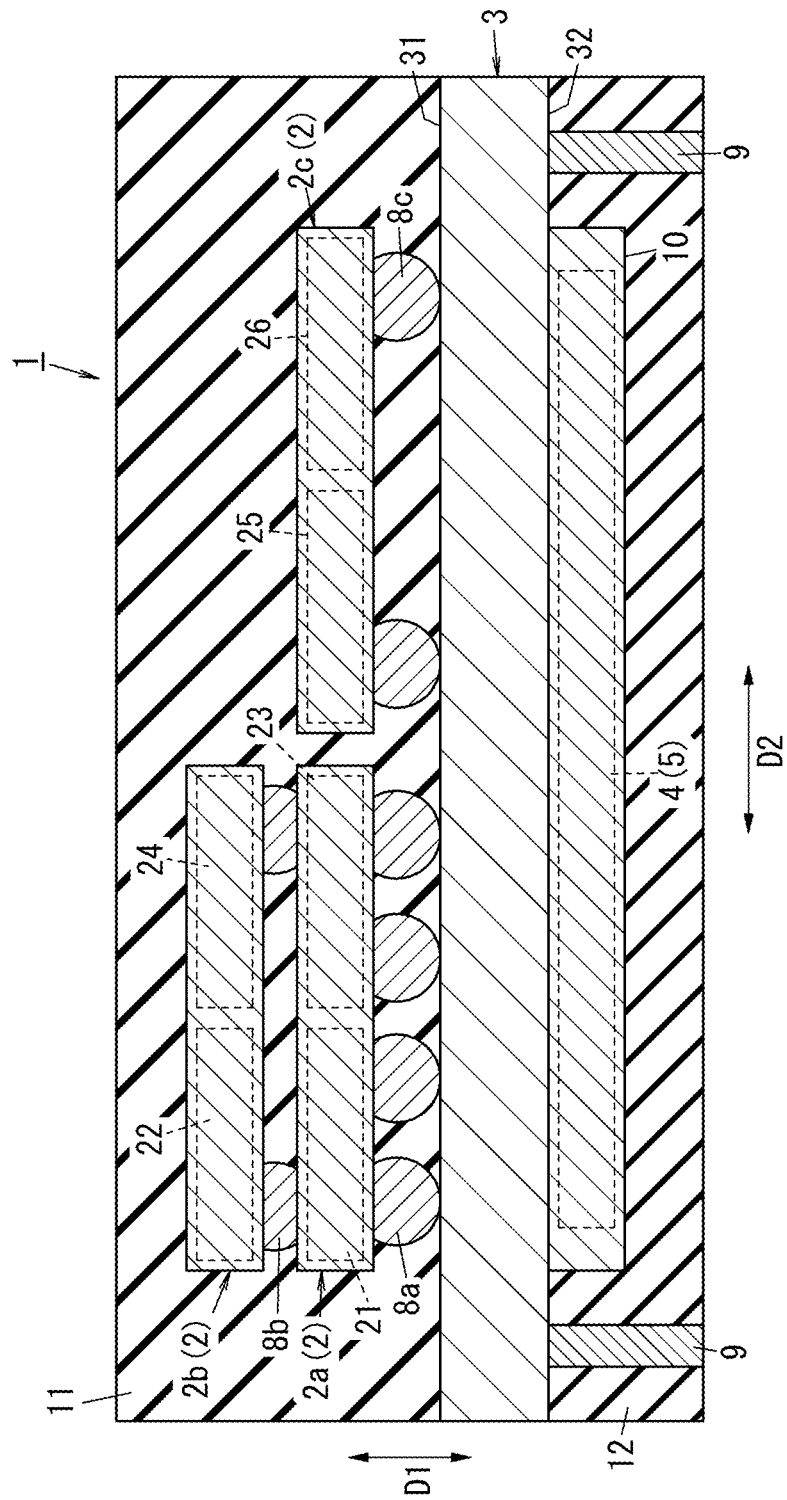
FIG. 1 is a sectional view schematically illustrating a radio frequency module according to Embodiment 1.

The radio frequency module 1 according to the present embodiment includes a mounting substrate 3, a first filter 21, a second filter 22, and a low-noise amplifier 4 as illustrated in FIG. 1. The mounting substrate 3 has a first main surface 31 and a second main surface 32 on opposite sides of the mounting substrate 3. The first filter 21 allows the first receiving signal in the first frequency band to pass through. The second filter 22 allows the second receiving signal in the second frequency band to pass through. The second frequency band is different from the first frequency band. That is, the frequency of a first signal passing through the first filter 21 and the frequency of a second signal passing through the second filter 22 are different from each other. The low-noise amplifier 4 is connected to the first filter 21 and the second filter 22 and is provided on the first main surface 31 or on the second main surface 32 of the mounting substrate 3. The first filter 21 is provided on the first main surface 31 of the mounting substrate 3. The second filter 22 is stacked on the first filter 21. That is, a footprint of the first filter 21 overlaps a footprint of the second filter 22 in a plan view in a thickness direction D1 of the mounting substrate 3.

Figure 2:
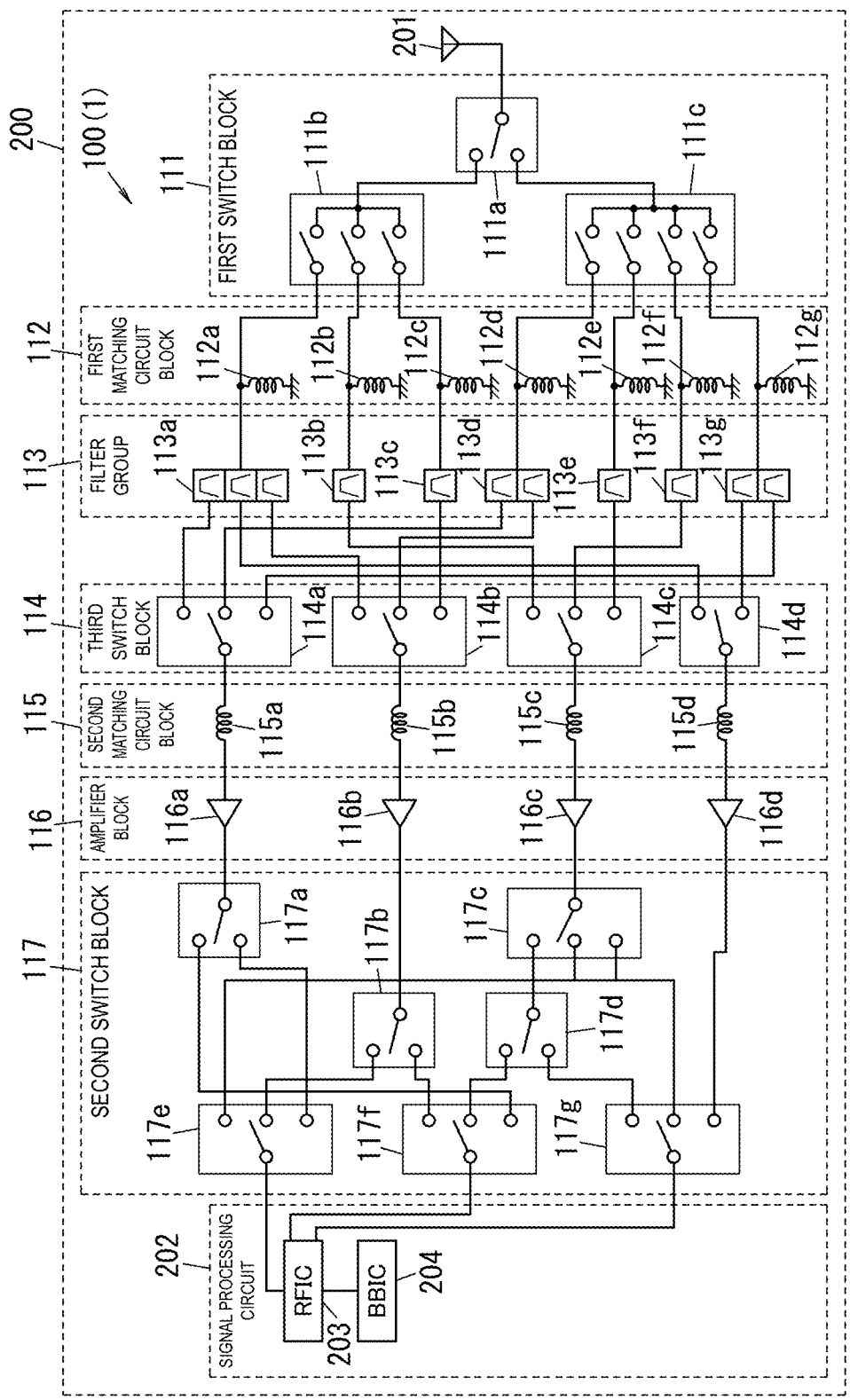
FIG. 2 is a circuit configuration diagram illustrating a front-end module as the radio frequency module described above.

The communication device 200 according to the present embodiment includes the radio frequency module 1 and a signal processing circuit 202 as illustrated in FIG. 2. The signal processing circuit 202 processes the first receiving signal passing through the first filter 21 and the second receiving signal passing through the second filter 22.

The first filter 21 and the second filter 22 that are connected to the same low-noise amplifier 4 are stacked in the thickness direction D1 of the mounting substrate 3 in the radio frequency module 1 and the communication device 200 according to the present embodiment. This enables the mounting substrate 3 to be reduced in size compared with the case in which the first filter 21 and the second filter 22 are separately provided on the first main surface 31 of the mounting substrate 3. Accordingly, the radio frequency module 1 and the communication device 200 that include the mounting substrate 3 may also be reduced in size.

(2) Individual Constituent Elements in Radio Frequency Module

The radio frequency module 1 according to the present embodiment includes the mounting substrate 3, a plurality of (three in illustrated example) filter units 2, and a switch integrated circuit (IC) 10 as illustrated in FIG. 1. Further, the radio frequency module 1 includes a plurality of external connection electrodes 9, a first resin layer 11, and a second resin layer 12. In the case in which the plurality of filter units 2 is distinguished from each other, each of the plurality of filter units 2 is also referred to as "a first filter unit 2a", "a second filter unit 2b", and "a third filter unit 2c" in the following description.

(2.1) Mounting Substrate

The mounting substrate 3 has the first main surface 31 and the second main surface 32 as illustrated in FIG. 1. The first main surface 31 and the second main surface 32 are on opposite sides of the mounting substrate 3 in the first direction D1 which is the thickness direction of the mounting substrate 3. Electronic components such as the filter unit 2 constituting the radio frequency module 1 are mounted on the first main surface 31 and the second main surface 32. The plurality of filter units 2 is mounted on the first main surface 31, and the switch IC 10 is mounted on the second main surface 32 in the present embodiment.

(2.2) First Filter Unit

The first filter unit 2a includes the first filter 21 and a third filter 23 as illustrated in FIG. 1. That is, the first filter 21 and the third filter 23 are integrated in a single chip in the first filter unit 2a. Further, in the first filter unit 2a, the first filter 21 and the third filter 23 are arranged side by side in a second direction D2 which is a direction orthogonal to the first direction D1. The first filter unit 2a is connected to the mounting substrate 3 via a plurality of external connection terminals 8a. Each of the plurality of external connection terminals 8a is a solder bump, for example, but may be a gold bump.

The first filter 21 is a radio frequency filter, for example. The first filter 21 allows a receiving signal (first receiving signal) in the first frequency band among the receiving signals that an antenna 201 (see FIG. 2) has received to pass through. The first frequency band includes a communication band Band 1, for example. The communication band Band 1 is 2110 MHz to 2170 MHz.

The third filter 23 is a radio frequency filter, for example. The third filter 23 allows a receiving signal (third receiving signal) in a third frequency band among the receiving signals that the antenna 201 has received to pass through. The third frequency band includes a communication band Band 3, for example. The communication band Band 3 is 1805 MHz to 1880 MHz.

Band 1 and Band 3 may be simultaneously used when a signal is received in Carrier Aggregation. That is, the radio frequency module 1 performs the simultaneous communication by using the first filter 21 and the third filter 23 which are arranged side by side in the second direction D2. The second direction D2 is a direction orthogonal to the first direction D1 which is the thickness direction of the mounting substrate 3.

Each of the first filter 21 and the third filter 23 is an acoustic wave filter, for example. Each of a plurality of series-arm resonators and a plurality of parallel-arm resonators is constituted by an acoustic wave resonator in each of the first filter 21 and the third filter 23. The acoustic wave resonator is a surface acoustic wave (SAW) resonator, for example.

The SAW resonator includes a piezoelectric body substrate and an interdigital transducer (IDT) electrode provided on the piezoelectric body substrate, for example. In the case in which each of the plurality of series-arm resonators and the plurality of parallel-arm resonators is constituted by the SAW resonator, each of the first filter 21 and the third filter 23 includes a plurality of IDT electrodes corresponding to the plurality of series-arm resonators on a one-to-one basis and a plurality of IDT electrodes corresponding to the plurality of parallel-arm resonators on a one-to-one basis on a single piezoelectric body substrate.

The piezoelectric body substrate is a lithium tantalate substrate, a lithium niobate substrate, or the like, for example.

The first filter unit 2a is adopted for a filter 113d of a filter group 113 (see FIG. 2) which will be described later.

(2.3) Second Filter Unit

The second filter unit 2b includes the second filter 22 and a fourth filter 24 as illustrated in FIG. 1. That is, the second filter 22 and the fourth filter 24 are integrated in a single chip in the second filter unit 2b. Further, in the second filter unit 2b, the second filter 22 and the fourth filter 24 are arranged side by side in the second direction D2. The second filter unit 2b is connected to the first filter unit 2a via a plurality of external connection terminals 8b and is further connected to the mounting substrate 3 via the first filter unit 2a and the plurality of external connection terminals 8a. Each of the plurality of external connection terminals 8b is a solder bump, for example, but may be a gold bump.

The second filter 22 is a radio frequency filter, for example. The second filter 22 allows a receiving signal (second receiving signal) in the second frequency band among the receiving signals that the antenna 201 (see FIG. 2) has received to pass through. The second frequency band includes a communication band Band 66, for example. The communication band Band 66 is 2110 MHz to 2200 MHz.

The fourth filter 24 is a radio frequency filter, for example. The fourth filter 24 allows a receiving signal (fourth receiving signal) in a fourth frequency band among the receiving signals that the antenna 201 has received to pass through. The fourth frequency band includes a communication band Band 25, for example. The communication band Band 25 is 1930 MHz to 1995 MHz.

Band 66 and Band 25 may be simultaneously used when a signal is received in Carrier Aggregation. That is, the radio frequency module 1 performs the simultaneous communication by using the second filter 22 and the fourth filter 24 which are arranged side by side in the second direction D2. The second direction D2 is the direction orthogonal to the first direction D1 which is the thickness direction of the mounting substrate 3. In other words, the radio frequency module 1 does not perform the simultaneous communication with the first filter 21 and the second filter 22 stacked in the first direction D1 which is the thickness direction of the mounting substrate 3. Further, the radio frequency module 1 does not perform the simultaneous communication with the third filter 23 and the fourth filter 24 stacked in the first direction D1. That is, the third filter 23 is a filter that is different from the second filter 22.

In the radio frequency module 1, the first filter 21 and the third filter 23 that perform the simultaneous communication are arranged side by side in the second direction D2, and the second filter 22 and the fourth filter 24 that perform the simultaneous communication are arranged side by side in the second direction D2. This enables the distance between the output terminals of filters performing the simultaneous communication to be larger than the distance in the case in which the first filter 21 and the third filter 23 are stacked in the first direction D1 and the second filter 22 and the fourth filter 24 are stacked in the first direction D1. Accordingly, it is possible to suppress a decrease in isolation between the output terminals of the filters performing the simultaneous communication.

Each of the second filter 22 and the fourth filter 24 is an acoustic wave filter, for example. Each of a plurality of series-arm resonators and a plurality of parallel-arm resonators is constituted by an acoustic wave resonator in each of the second filter 22 and the fourth filter 24. The acoustic wave resonator is a SAW resonator, for example.

The second filter unit 2b is adopted for a filter 113g of the filter group 113 (see FIG. 2) which will be described later.

The first filter 21 of the first filter unit 2a and the second filter 22 of the second filter unit 2b are stacked (disposed) from the first main surface 31 side in the order of the first filter 21 and the second filter 22 in the first direction D1 in the radio frequency module 1. The first direction D1 is the thickness direction of the mounting substrate 3. That is, the footprint of the first filter 21 overlaps the footprint of the second filter 22 in a plan view in the first direction D1.

Further, the third filter 23 of the first filter unit 2a and the fourth filter 24 of the second filter unit 2b are stacked (disposed) from the first main surface 31 side in the order of the third filter 23 and the fourth filter 24 in the first direction D1 in the radio frequency module 1.

That is, a footprint of the third filter 23 overlaps a footprint of the fourth filter 24 in a plan view in the first direction D1.

(2.4) Third Filter Unit

The third filter unit 2c includes a fifth filter 25 and a sixth filter 26 as illustrated in FIG. 1. That is, the fifth filter 25 and the sixth filter 26 are integrated in a single chip in the third filter unit 2c. Further, in the third filter unit 2c, the fifth filter 25 and the sixth filter 26 are arranged side by side in the second direction D2. The third filter unit 2c is connected to the mounting substrate 3 via a plurality of external connection terminals 8c. Each of the plurality of external connection terminals 8c is a solder bump, for example, but may be a gold bump.

The fifth filter 25 allows a receiving signal (fifth receiving signal) in a fifth frequency band among the receiving signals that the antenna 201 (see FIG. 2) has received to pass through. The fifth frequency band includes a communication band Band 34, for example. The sixth filter 26 allows a receiving signal (sixth receiving signal) in a sixth frequency band among the receiving signals that the antenna 201 has received to pass through. The sixth frequency band includes a communication band Band 39, for example. The communication band Band 34 is 2010 MHz to 2025 MHz. The communication band Band 39 is 1880 MHz to 1920 MHz.

Band 34 and Band 39 may be simultaneously used when a signal is received in Carrier Aggregation. That is, the radio frequency module 1 performs the simultaneous communication by using the fifth filter 25 and the sixth filter 26 which are arranged side by side in the second direction D2. The second direction D2 is the direction orthogonal to the first direction D1 which is the thickness direction of the mounting substrate 3.

Each of the fifth filter 25 and the sixth filter 26 is an acoustic wave filter, for example. Each of the plurality of series-arm resonators and the plurality of parallel-arm resonators is constituted by an acoustic wave resonator in each of the fifth filter 25 and the sixth filter 26. The acoustic wave resonator is a SAW resonator, for example.

The third filter unit 2c is adopted for a filter 113a of the filter group 113 (see FIG. 2) which will be described later.

(2.5) Switch IC

The switch IC 10 is an integrated circuit including the low-noise amplifier 4 and an antenna switch 5 as illustrated in FIG. 1.

The low-noise amplifier 4 has an input terminal and an output terminal. The low-noise amplifier 4 amplifies the receiving signal in a predetermined frequency band that has passed through the filter unit 2 and is inputted to the input terminal, and outputs the amplified signal from the output terminal. That is, the low-noise amplifier 4 amplifies and outputs the receiving signal that has passed through the filter unit 2. The low-noise amplifier 4 is adopted for an amplifier block 116 (see FIG. 2) which will be described later.

The antenna switch 5 is a single pole single throw (SPST)-type switch, for example. The antenna switch 5 is connected between the antenna 201 (see FIG. 2) which will be described later and the filter group 113 (see FIG. 2), and switches between a conductive state and a non-conductive state. The antenna 201 and the filter group 113 are connected in the conductive state, and the antenna 201 and the filter group 113 are disconnected in the non-conductive state. The antenna switch 5 is adopted for a first switch block 111 (see FIG. 2) which will be described later.

The switch IC 10 is mounted on the second main surface 32 of the mounting substrate 3 in the radio frequency module 1 as illustrated in FIG. 1. The low-noise amplifier 4 and the antenna switch 5 that are included in the switch IC 10 are arranged side by side in a third direction D3 orthogonal to both the first direction D1 and the second direction D2.

(2.6) External Connection Electrode

The plurality of external connection electrodes 9 is provided on the second main surface 32 of the mounting substrate 3. The plurality of external connection electrodes 9 connects the radio frequency module 1 to a mother substrate on which the signal processing circuit 202 which will be described later and the like are mounted. The plurality of external connection electrodes 9 is a pillar-shaped (columnar, for example) electrode. The material of the plurality of external connection electrodes 9 is, for example, a metal (such as copper, or a copper alloy, for example).

(2.7) Resin Layer

The first resin layer 11 covers electronic components such as the filter unit 2 mounted on the first main surface 31 of the mounting substrate 3 in the first main surface 31 side of the mounting substrate 3. The second resin layer 12 covers electronic components such as the switch IC 10 mounted on the second main surface 32 of the mounting substrate 3 in the second main surface 32 side of the mounting substrate 3. Note that the material of the first resin layer 11 and the material of the second resin layer 12 may be the same or different from each other.

(3) Layout of Radio Frequency Module

Next, the layout of the filter unit 2 and the like constituting the radio frequency module 1 will be described with reference to FIG. 3.

Figure 3:
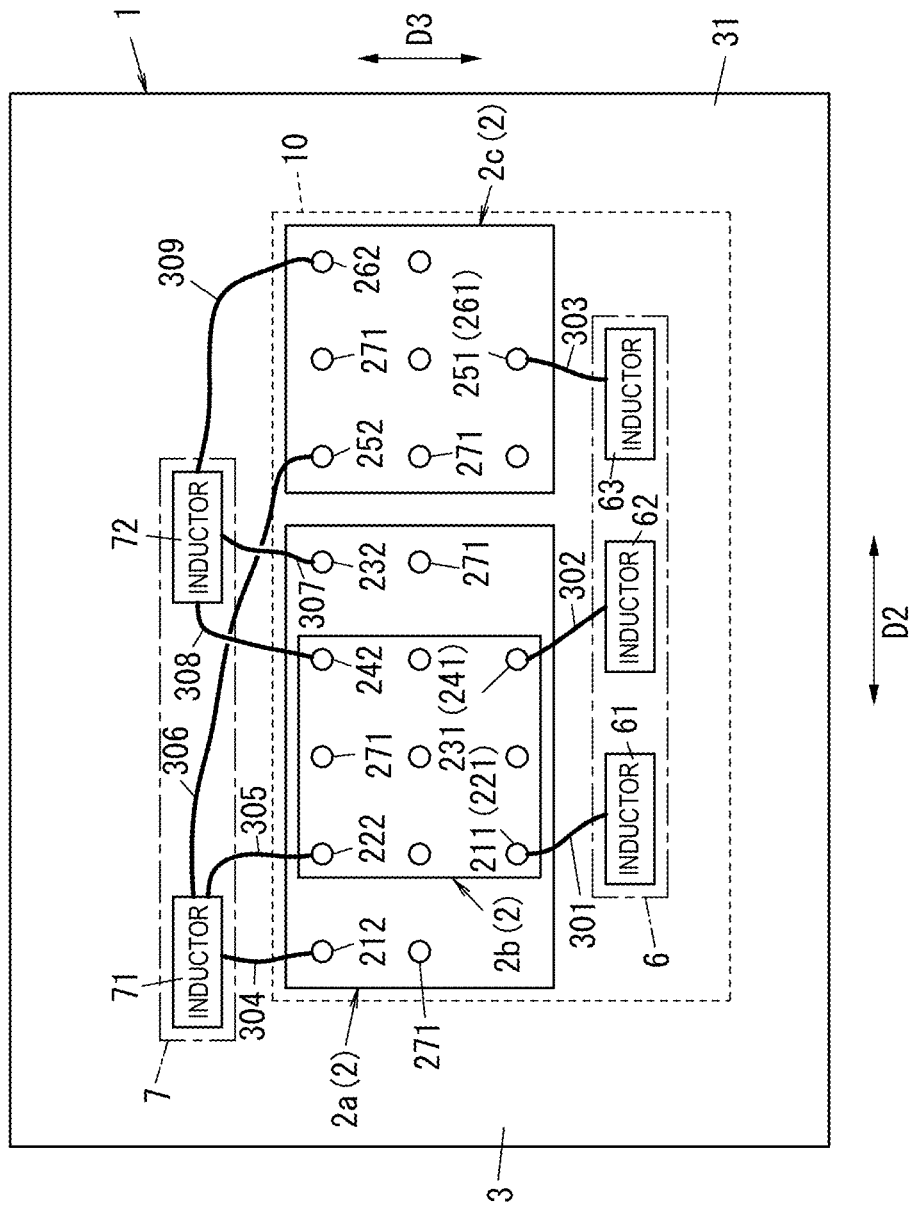
FIG. 3 is a plan view schematically illustrating the radio frequency module described above.

FIG. 3 is a plan view of the mounting substrate 3 on which the filter unit 2 and the like are mounted when viewed from the first main surface 31 side. The external dimensions of the first filter unit 2a are larger than the external dimensions of the second filter unit 2b in FIG. 3, but the external dimensions of the first filter unit 2a may be the same as or smaller than the external dimensions of the second filter unit 2b.

The first filter unit 2a, the second filter unit 2b, the third filter unit 2c, a first matching circuit 6, and a second matching circuit 7 are mounted on the first main surface 31 of the mounting substrate 3. The switch IC 10 including the low-noise amplifier 4 and the antenna switch 5 is mounted on the second main surface 32 of the mounting substrate 3.

The first matching circuit 6 includes a plurality of inductors 61 to 63, and is adopted for part of a first matching circuit block 112 (inductors 112a, 112d, and 112g, for example, see FIG. 2) which will be described later. The second matching circuit 7 includes a plurality of inductors 71 and 72, and is adopted for part of a second matching circuit block 115 (inductors 115a and 115b, for example, see FIG. 2) which will be described later.

The first filter unit 2a and the second filter unit 2b are mounted on the first main surface 31 in a state of being stacked from the first main surface 31 side in the order of the first filter unit 2a and the second filter unit 2b in the first direction D1. The first direction D1 is the thickness direction of the mounting substrate 3. That is, the second filter unit 2b is stacked on the first filter unit 2a.

The third filter unit 2c is mounted on the first main surface 31 in a state of being adjacent to the first filter unit 2a and the second filter unit 2b in the second direction D2. The second direction D2 is the direction orthogonal to the first direction D1. That is, each of the fifth filter 25 and the sixth filter 26 included in the third filter unit 2c is another filter in the radio frequency module 1. In this description and the like, "being adjacent" means that there are no other electronic components between two adjacent electronic components. In FIG. 3, there are no other electronic components between the first filter unit 2a and the third filter unit 2c or between the second filter unit 2b and the third filter unit 2c.

The switch IC 10 is mounted on the second main surface 32 of the mounting substrate 3. A footprint of the switch IC 10 overlaps a footprint of the first filter unit 2a and a footprint of the second filter unit 2b in a plan view in the first direction D1 which is the thickness direction of the mounting substrate 3. In more detail, the footprint of the low-noise amplifier 4 included in the switch IC 10 overlaps part of the footprint of the first filter unit 2a and the footprint of the second filter unit 2b in a plan view in the first direction D1.

The first matching circuit 6 is provided on one end side (lower side in FIG. 3) of the first filter unit 2a, the second filter unit 2b, and the third filter unit 2c in the third direction D3. The third direction D3 is orthogonal to both the first direction D1 and the second direction D2. The first matching circuit 6 is adjacent to the first filter unit 2a, the second filter unit 2b, and the third filter unit 2c in a plan view in the first direction D1.

The second matching circuit 7 is provided on the other end side (upper side in FIG. 3) of the first filter unit 2a, the second filter unit 2b, and the third filter unit 2c in the third direction D3. The second matching circuit 7 is adjacent to the first filter unit 2a, the second filter unit 2b, and the third filter unit 2c in a plan view in the first direction D1.

The first filter 21 of the first filter unit 2a has a first input terminal 211 and a first output terminal 212. The second filter 22 of the second filter unit 2b has a second input terminal 221 and a second output terminal 222. The third filter 23 of the first filter unit 2a has a third input terminal 231 and a third output terminal 232. The fourth filter 24 of the second filter unit 2b has a fourth input terminal 241 and a fourth output terminal 242. The fifth filter 25 of the third filter unit 2c has a fifth input terminal 251 and a fifth output terminal 252. The sixth filter 26 of the third filter unit 2c has a sixth input terminal 261 and a sixth output terminal 262. Each of the first filter unit 2a, the second filter unit 2b, and the third filter unit 2c further includes a plurality of terminals 271. At least one of the plurality of terminals 271 is a ground terminal, for example.

In the radio frequency module 1, the first input terminal 211 and the mounting substrate 3 are connected via the external connection terminal (first external connection terminal) 8a, and the second input terminal 221 and the mounting substrate 3 are connected via the external connection terminal 8a, the first input terminal 211, and the external connection terminal (second external connection terminal) 8b. That is, the first input terminal 211 and the second input terminal 221 are bundled by the external connection terminal 8b in the radio frequency module 1. The first input terminal 211 and the second input terminal 221 are connected to the inductor 61 of the first matching circuit 6 with a conductor pattern 301 formed on the first main surface 31 of the mounting substrate 3.

Further, in the radio frequency module 1, the third input terminal 231 and the mounting substrate 3 are connected via the external connection terminal 8a, and the fourth input terminal 241 and the mounting substrate 3 are connected via the external connection terminal 8a, the third input terminal 231, and the external connection terminal 8b. That is, the third input terminal 231 and the fourth input terminal 241 are bundled by the external connection terminal 8b in the radio frequency module 1. The third input terminal 231 and the fourth input terminal 241 are connected to the inductor 62 of the first matching circuit 6 with a conductor pattern 302 formed on the first main surface 31 of the mounting substrate 3.

Further, in the radio frequency module 1, the fifth input terminal 251 and the sixth input terminal 261 are connected inside the third filter unit 2c, and are further connected to the mounting substrate 3 via the external connection terminal 8c. That is, the fifth input terminal 251 and the sixth input terminal 261 are bundled inside the third filter unit 2c in the radio frequency module 1. The fifth input terminal 251 and the sixth input terminal 261 are connected to the inductor 63 of the first matching circuit 6 with a conductor pattern 303 formed on the first main surface 31 of the mounting substrate 3.

In the radio frequency module 1, in a plan view in the first direction D1, the first input terminal 211 of the first filter 21 is positioned at the first matching circuit 6 side end portion of the first filter 21 (first filter unit 2a), and the second input terminal 221 of the second filter 22 is positioned at the first matching circuit 6 side end portion of the second filter 22 (second filter unit 2b). In the radio frequency module 1, in a plan view in the first direction D1, the third input terminal 231 of the third filter 23 (first filter unit 2a) is positioned at the first matching circuit 6 side end portion of the third filter 23, and the fourth input terminal 241 of the fourth filter 24 is positioned at the first matching circuit 6 side end portion of the fourth filter 24 (second filter unit 2b). In the radio frequency module 1, in a plan view in the first direction D1, the fifth input terminal 251 of the fifth filter 25 is positioned at the first matching circuit 6 side end portion of the fifth filter 25 (third filter unit 2c), and the sixth input terminal 261 of the sixth filter 26 is positioned at the first matching circuit 6 side end portion of the sixth filter 26 (third filter unit 2c). Accordingly, it is possible to shorten the conductor patterns 301 to 303 connecting the first input terminal 211 to the sixth input terminal 261 and the first matching circuit 6.

The first output terminal 212 is connected to the mounting substrate 3 via the external connection terminal 8a. Further, the first output terminal 212 is connected to the inductor 71 of the second matching circuit 7 with a conductor pattern 304 formed on the first main surface 31 of the mounting substrate 3. The second output terminal 222 is connected to the mounting substrate 3 via the external connection terminals 8a and 8b. Further, the second output terminal 222 is connected to the inductor 71 of the second matching circuit 7 with a conductor pattern 305 formed on the first main surface 31 of the mounting substrate 3.

The third output terminal 232 is connected to the mounting substrate 3 via the external connection terminal 8a. Further, the third output terminal 232 is connected to the inductor 72 of the second matching circuit 7 with a conductor pattern 307 formed on the first main surface 31 of the mounting substrate 3. The fourth output terminal 242 is connected to the mounting substrate 3 via the external connection terminals 8a and 8b. Further, the fourth output terminal 242 is connected to the inductor 72 of the second matching circuit 7 with a conductor pattern 308 formed on the first main surface 31 of the mounting substrate 3.

The fifth output terminal 252 is connected to the mounting substrate 3 via the external connection terminal 8c. Further, the fifth output terminal 252 is connected to the inductor 71 of the second matching circuit 7 with a conductor pattern 306 formed on the first main surface 31 of the mounting substrate 3. The sixth output terminal 262 is connected to the mounting substrate 3 via the external connection terminal 8c. Further, the sixth output terminal 262 is connected to the inductor 72 of the second matching circuit 7 with a conductor pattern 309 formed on the first main surface 31 of the mounting substrate 3.

In the radio frequency module 1, in a plan view in the first direction D1, the first output terminal 212 of the first filter 21 is positioned at the second matching circuit 7 side end portion of the first filter 21 (first filter unit 2a), and the second output terminal 222 of the second filter 22 is positioned at the second matching circuit 7 side end portion of the second filter 22 (second filter unit 2b). In the radio frequency module 1, in a plan view in the first direction D1, the third output terminal 232 of the third filter 23 is positioned at the second matching circuit 7 side end portion of the third filter 23 (first filter unit 2a), and the fourth output terminal 242 of the fourth filter 24 is positioned at the second matching circuit 7 side end portion of the fourth filter 24 (second filter unit 2b). In the radio frequency module 1, in a plan view in the first direction D1, the fifth output terminal 252 of the fifth filter 25 is positioned at the second matching circuit 7 side end portion of the fifth filter 25 (third filter unit 2c), and the sixth output terminal 262 of the sixth filter 26 is positioned at the second matching circuit 7 side end portion of the sixth filter 26 (third filter unit 2c). Accordingly, it is possible to shorten the conductor patterns 304 to 309 connecting the first output terminal 212 to the sixth output terminal 262 and the second matching circuit 7.

Further, in the radio frequency module 1, the first input terminal 211 and the mounting substrate 3 are connected via the external connection terminal 8a, and the second input terminal 221 and the mounting substrate 3 are connected via the external connection terminals 8a and 8b and the first input terminal 211. Consequently, the ground region for the first filter 21 and the second filter 22 in the ground region of the mounting substrate 3 may be made larger than that in the case in which the first input terminal 211 and the second input terminal 221 are separately connected to the mounting substrate 3. Accordingly, deterioration in the filter characteristic of the first filter 21 and the second filter 22 may be suppressed. The same applies to the third filter 23 and the fourth filter 24. In the present embodiment, the first input terminal 211 is a first signal terminal and the second input terminal 221 is a second signal terminal.

Further, in the radio frequency module 1, the first filter 21 (first filter unit 2a) is provided on the first main surface 31 of the mounting substrate 3, and further, the second filter 22 (second filter unit 2b) is stacked on the first filter 21. That is, the first filter 21 and the second filter 22 connected to the same low-noise amplifier 4 are stacked on the mounting substrate 3. This makes it possible to reduce the mounting substrate 3 in size compared with the case in which the first filter 21 and the second filter 22 are separately disposed on the first main surface 31 of the mounting substrate 3.

Further, since the radio frequency module 1 includes this mounting substrate 3, the radio frequency module 1 may also be reduced in size.

(4) Application Example

The radio frequency module 1 according to the present embodiment may be adopted as a front-end module 100 illustrated in FIG. 2.

The front-end module 100 as the radio frequency module 1 is provided in the communication device 200. The communication device 200 includes the front-end module 100 and the signal processing circuit 202 as illustrated in FIG. 2. The communication device 200 transmits and receives signals via the antenna 201. In FIG. 2, only the reception-side circuit is illustrated and the transmission-side circuit is omitted.

(4.1) Front-End Module

First, the circuit configuration of the front-end module 100 will be described.

The front-end module 100 is disposed in a front-end unit of a multimode/multiband mobile phone, for example. The front-end module 100 is built in a multiband mobile phone compliant with a communication standard such as LTE, for example. The front-end module 100 has a plurality of paths (signal paths) through which a plurality of radio frequency signals in different frequency bands is transferred.

The front-end module 100 includes the first switch block 111, the first matching circuit block 112, the filter group 113, a third switch block 114, the second matching circuit block 115, the amplifier block 116, and a second switch block 117 as illustrated in FIG. 2. The first switch block 111, the second switch block 117, the third switch block 114, and the amplifier block 116 are included in the switch IC 10 (see FIG. 1). In other words, the first switch block 111, the second switch block 117, the third switch block 114, and the amplifier block 116 are formed in a single chip to constitute the switch IC 10.

The plurality of signal paths is the path through which a signal passes the switch IC 10, the filter group 113, the first matching circuit block 112, and the second matching circuit block 115. The signal passes through the plurality of signal paths in the order of the first switch block 111, the first matching circuit block 112, the filter group 113, the third switch block 114, the second matching circuit block 115, the amplifier block 116, and the second switch block 117.

(4.1.1) First Switch Block

The first switch block 111 includes switches 111a to 111c, for example. The switches 111a to 111c are field effect transistor (FET) switches formed of GaAs or complementary metal oxide semiconductor (CMOS), or diode switches, for example. The input terminal of the first switch block 111 is connected to the antenna 201. Further, the output terminal of the first switch block 111 is connected to the input terminal of the filter group 113. The first switch block 111 divides the signal received by the antenna 201 for signal paths for each of the filters 113a to 113g constituting the filter group 113. Each of the switches 111a to 111c switches connection states in accordance with a control signal from an RF signal processing circuit 203 which will be described later, for example. In the present embodiment, the first switch block 111 is constituted by the antenna switch 5 (see FIG. 1).

(4.1.2) First Matching Circuit Block

The first matching circuit block 112 includes inductors 112a to 112g, for example. Each of the inductors 112a to 112g is a circuit element for matching the impedances of the first switch block 111 and the filter group 113. One end of each of the inductors 112a to 112g is connected to a path connecting the switches 111a to 111c of the first switch block 111 and the filters 113a to 113g of the filter group 113, and the other end of each of the inductors 112a to 112g is connected to a reference terminal (ground). Note that each of the inductors 112a to 112g may be connected in series to the above-mentioned path. Further, the first matching circuit block 112 is not limited to the inductors 112a to 112g, and may be capacitors or circuits combining inductors and capacitors. In the present embodiment, the inductors 61, 62, and 63 of the first matching circuit 6 is adopted for the inductors 112a, 112d, and 112g that are part of the first matching circuit block 112.

(4.1.3) Filter Group

The filter group 113 includes the filters 113a to 113g constituted by a surface acoustic wave resonator, a bulk acoustic wave (BAW) resonator, a film bulk acoustic resonator (FBAR), or the like. Note that the filters 113a to 113g may be constituted by an LC resonance circuit or the like. In the present embodiment, the filters 113a to 113g are constituted by a surface acoustic wave resonator. The output terminal of the filter group 113 is connected to the input terminal of the third switch block 114.

The filter 113a is a triplexer in which input terminals of three filters are formed into a common terminal, for example. Further, each of the filters 113d and 113g is a duplexer in which input terminals of two filters are formed into a common terminal, for example.

In the present embodiment, two filters out of three filters constituting the filter 113a are constituted by the fifth filter 25 and the sixth filter 26 included in the third filter unit 2c. Two filters constituting the filter 113d are constituted by the first filter 21 included in the first filter unit 2a and the second filter 22. Two filters constituting the filter 113g are constituted by the third filter 23 included in the second filter unit 2b and the fourth filter 24.

(4.1.4) Third Switch Block

The third switch block 114 includes switches 114a to 114d. The switches 114a to 114c are FET switches made of GaAs or CMOS, or diode switches, for example. Each of the output terminals of the switches 114a to 114d is connected to the input terminal of the second matching circuit block 115. Specifically, each of the input terminals of the switches 114a to 114d is connected to the filter group 113, and the output terminals of the switches 114a to 114d are connected to the inductors 115a to 115d of the second matching circuit block 115, respectively. Each of the switches 114a to 114d selects a signal that has passed through the filters 113a to 113g, and outputs the selected signal to the second matching circuit block 115. Each of the switches 114a to 114c switches the connection states in accordance with a control signal from the RF signal processing circuit 203, for example.

(4.1.5) Second Matching Circuit Block

The second matching circuit block 115 includes inductors 115a to 115d. Each of the inductors 115a to 115d is a circuit element for matching the impedances of the third switch block 114 and the amplifier block 116. One end of each of the inductors 115a to 115d is connected to the corresponding one of the switches 114a to 114d, and the other end of each of the inductors 115a to 115d is connected to the corresponding one of the amplifier circuits 116a to 116d. Note that each of the inductors 115a to 115d may be connected between the ground and a path connecting the third switch block 114 and the amplifier block 116. Further, the second matching circuit block 115 is not limited to the inductors 115a to 115g, and may be capacitors or circuits combining inductors and capacitors. In the present embodiment, the inductors 71 and 72 of the second matching circuit 7 are adopted for the inductors 115a and 115b that are part of the second matching circuit block 115.

(4.1.6) Amplifier Block

The amplifier block 116 includes the amplifier circuits 116a to 116d. Each of the amplifier circuits 116a to 116d amplifies a signal that has passed through the first switch block 111, the first matching circuit block 112, the filter group 113, the third switch block 114, and the second matching circuit block 115. Each of the amplifier circuits 116a to 116d is the low-noise amplifier 4 (see FIG. 1), for example. Each of the input terminals of the amplifier circuits 116a to 116d is connected to the corresponding inductor of the inductors 115a to 115d. Each of the output terminals of the amplifier circuits 116a to 116d is connected to the second switch block 117.

(4.1.7) Second Switch Block

The second switch block 117 includes switches 117a to 117g, for example. The switches 117a to 117c are FET switches made of GaAs or CMOS, or diode switches, for example. The second switch block 117 is connected to the RF signal processing circuit 203 of the signal processing circuit 202. The second switch block 117 distributes the signal amplified by the amplifier block 116 to predetermined terminals of the RF signal processing circuit 203. Each of the switches 117a to 117c switches the connection states in accordance with a control signal from the RF signal processing circuit 203, for example.

(4.2) Signal Processing Circuit

The signal processing circuit 202 includes the RF signal processing circuit 203 and a baseband signal processing circuit 204, for example. The RF signal processing circuit 203 is a radio frequency integrated circuit (RFIC), for example, and performs signal processing on a radio frequency signal. The baseband signal processing circuit 204 is a baseband integrated circuit (BBIC), for example, and performs predetermined signal processing on a transmission signal from the outside of the signal processing circuit 202. The receiving signal processed by the baseband signal processing circuit 204 is used as an image signal for an image display or as a voice signal for a voice communication, for example. The front-end module 100 transfers a radio frequency signal (receiving signal, here) between the antenna 201 and the RF signal processing circuit 203 of the signal processing circuit 202. The baseband signal processing circuit 204 is not an essential constituent element in the communication device 200.

As described above, the radio frequency module 1 according to the present embodiment may be adopted as the front-end module 100. The communication device 200 may be reduced in size by including the front-end module 100 as the radio frequency module 1.

In the present embodiment, there has been exemplified the front-end module 100 of a reception system which receives a signal from the antenna 201 and outputs the received signal to the RF signal processing circuit 203. However, the radio frequency module according to the present disclosure may also be adopted for a front-end module of a transmission system which receives a radio frequency transmission signal outputted from the RF signal processing circuit 203 and outputs the radio frequency transmission signal to an antenna or the like. In this case, the amplifier circuits 116a to 116d are not low-noise amplifiers, but may be power amplifiers to amplify the transmission signal, for example. The transmission signal flows in the order of the second switch block 117, the amplifier block 116, the second matching circuit block 115, the third switch block 114, the filter group 113, the first matching circuit block 112, and the first switch block 111. In this case, it is preferable that the first output terminal 212 be a first signal terminal and the second output terminal 222 be a second signal terminal. Further, it is preferable that the first output terminal 212 and the mounting substrate 3 be connected via the external connection terminal 8a, and the second output terminal 222 and the mounting substrate 3 be connected via the external connection terminals 8a and 8b and the first output terminal 212. With this configuration, the ground region for the first filter 21 and the second filter 22 in the ground region of the mounting substrate 3 may be made larger than that in the case in which the first output terminal 212 and the second output terminal 222 are separately connected to the mounting substrate 3. Accordingly, deterioration in the filter characteristic of the first filter 21 and the second filter 22 may be suppressed. The same applies to the third filter 23 and the fourth filter 24.

(5) Modifications

Hereinafter, modifications of the radio frequency module 1 according to Embodiment 1 will be described.

(5.1) Modification 1

A radio frequency module 1A according to Modification 1 will be described with reference to FIG. 4.

In the radio frequency module 1 according to Embodiment 1, the first input terminal 211 of the first filter 21 and the second input terminal 221 of the second filter 22 are connected to each other with the external connection terminal 8b to form a common terminal. Further, in the radio frequency module 1, the third input terminal 231 of the third filter 23 and the fourth input terminal 241 of the fourth filter 24 are connected to each other with the external connection terminal 8b to form a common terminal.

Whereas, as in the radio frequency module 1A according to Modification 1, the first input terminal 211 of the first filter 21 and the third input terminal 231 of the third filter 23 may be connected to each other to form a common terminal in the first filter unit 2a. Also, as in the radio frequency module 1A, the second input terminal 221 of the second filter 22 and the fourth input terminal 241 of the fourth filter 24 may be connected to each other to form a common terminal in the second filter unit 2b. Other configurations are the same as those of the radio frequency module 1 according to Embodiment 1, and a detailed description thereof will be omitted here.

Figure 4:
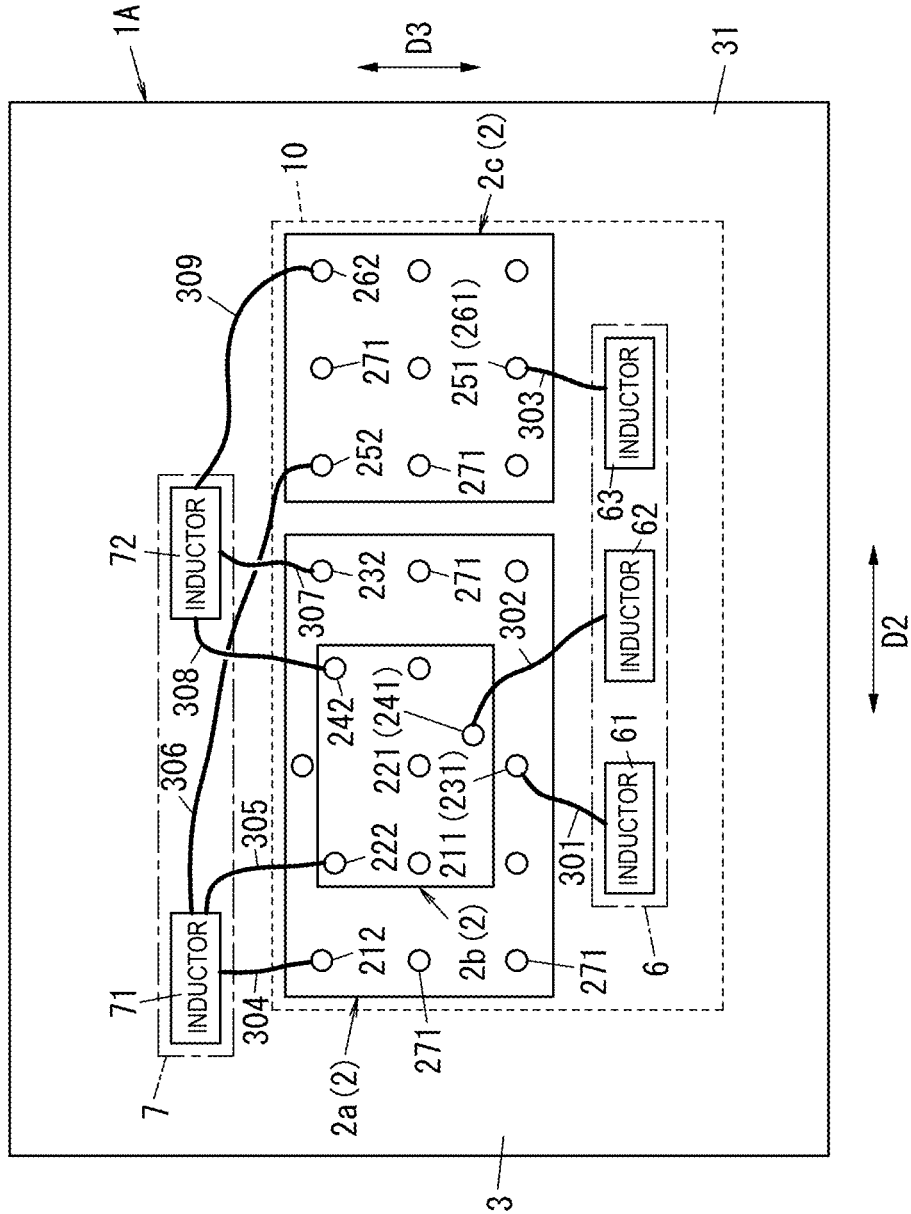
FIG. 4 is a plan view schematically illustrating a radio frequency module according to Modification 1 of Embodiment 1.

Here, the external dimensions of the first filter unit 2a are larger than the external dimensions of the second filter unit 2b in FIG. 4, but the external dimensions of the first filter unit 2a may be the same as or smaller than the external dimensions of the second filter unit 2b.

In the radio frequency module 1A according to Modification 1, in a plan view in the first direction D1, the first input terminal 211 of the first filter 21 is positioned at the first matching circuit 6 side end portion of the first filter 21 (first filter unit 2a), and the second input terminal 221 of the second filter 22 is positioned at the first matching circuit 6 side end portion of the second filter 22 (second filter unit 2b). In the radio frequency module 1A, in a plan view in the first direction D1, the third input terminal 231 of the third filter 23 is positioned at the first matching circuit 6 side end portion of the third filter 23 (first filter unit 2a), and the fourth input terminal 241 of the fourth filter 24 is positioned at the first matching circuit 6 side end portion of the fourth filter 24 (second filter unit 2b). In the radio frequency module 1A, in a plan view in the first direction D1, the fifth input terminal 251 of the fifth filter 25 is positioned at the first matching circuit 6 side end portion of the fifth filter 25 (third filter unit 2c), and the sixth input terminal 261 of the sixth filter 26 is positioned at the first matching circuit 6 side end portion of the sixth filter 26 (third filter unit 2c). Accordingly, it is possible to shorten the conductor patterns 301 to 303 connecting between the first input terminal 211 to the sixth input terminal 261 and the first matching circuit 6.

In the radio frequency module 1A according to Modification 1, in a plan view in the first direction D1, the first output terminal 212 of the first filter 21 is positioned at the second matching circuit 7 side end portion of the first filter 21 (first filter unit 2a), and the second output terminal 222 of the second filter 22 is positioned at the second matching circuit 7 side end portion of the second filter 22 (second filter unit 2b). In the radio frequency module 1A, in a plan view in the first direction D1, the third output terminal 232 of the third filter 23 is positioned at the second matching circuit 7 side end portion of the third filter 23 (first filter unit 2a), and the fourth output terminal 242 of the fourth filter 24 is positioned at the second matching circuit 7 side end portion of the fourth filter 24 (second filter unit 2b). In the radio frequency module 1A, in a plan view in the first direction D1, the fifth output terminal 252 of the fifth filter 25 is positioned at the second matching circuit 7 side end portion of the fifth filter 25 (third filter unit 2c), and the sixth output terminal 262 of the sixth filter 26 is positioned at the second matching circuit 7 side end portion of the sixth filter 26 (third filter unit 2c). Accordingly, it is possible to shorten the conductor patterns 304 to 309 connecting the first output terminal 212 to the sixth output terminal 262 and the second matching circuit 7.

(5.2) Modification 2

A radio frequency module 1B according to Modification 2 will be described with reference to FIG. 5.

In the radio frequency module 1 according to Embodiment 1, the first output terminal 212, the second output terminal 222, and the fifth output terminal 252 are connected to the inductor 71 which is one of the inductors included in the second matching circuit 7 as illustrated in FIG. 3. Further, in the radio frequency module 1, the third output terminal 232, the fourth output terminal 242, and the sixth output terminal 262 are connected to the inductor 72 which is the other of the inductors included in the second matching circuit 7 as illustrated in FIG. 3.

Whereas, as in the radio frequency module 1B according to Modification 2, the output terminals of the respective filters and the respective inductors of the second matching circuit 7 may correspond to each other on a one-to-one basis. In more detail, in the radio frequency module 1B, the first output terminal 212 of the first filter 21 is connected to the inductor 71 of the second matching circuit 7 via the conductor pattern 304, and the second output terminal 222 of the second filter 22 is connected to the inductor 72 of the second matching circuit 7 via the conductor pattern 305. In the radio frequency module 1B, the third output terminal 232 of the third filter 23 is connected to an inductor 75 of the second matching circuit 7 via the conductor pattern 307, and the fourth output terminal 242 of the fourth filter 24 is connected to an inductor 74 of the second matching circuit 7 via the conductor pattern 308. In the radio frequency module 1B, the fifth output terminal 252 of the fifth filter 25 is connected to an inductor 73 of the second matching circuit 7 via the conductor pattern 306, and the sixth output terminal 262 of the sixth filter 26 is connected to an inductor 76 of the second matching circuit 7 via the conductor pattern 309. Other configurations are the same as those of the radio frequency module 1 according to Embodiment 1, and a detailed description thereof will be omitted here.

Figure 5:
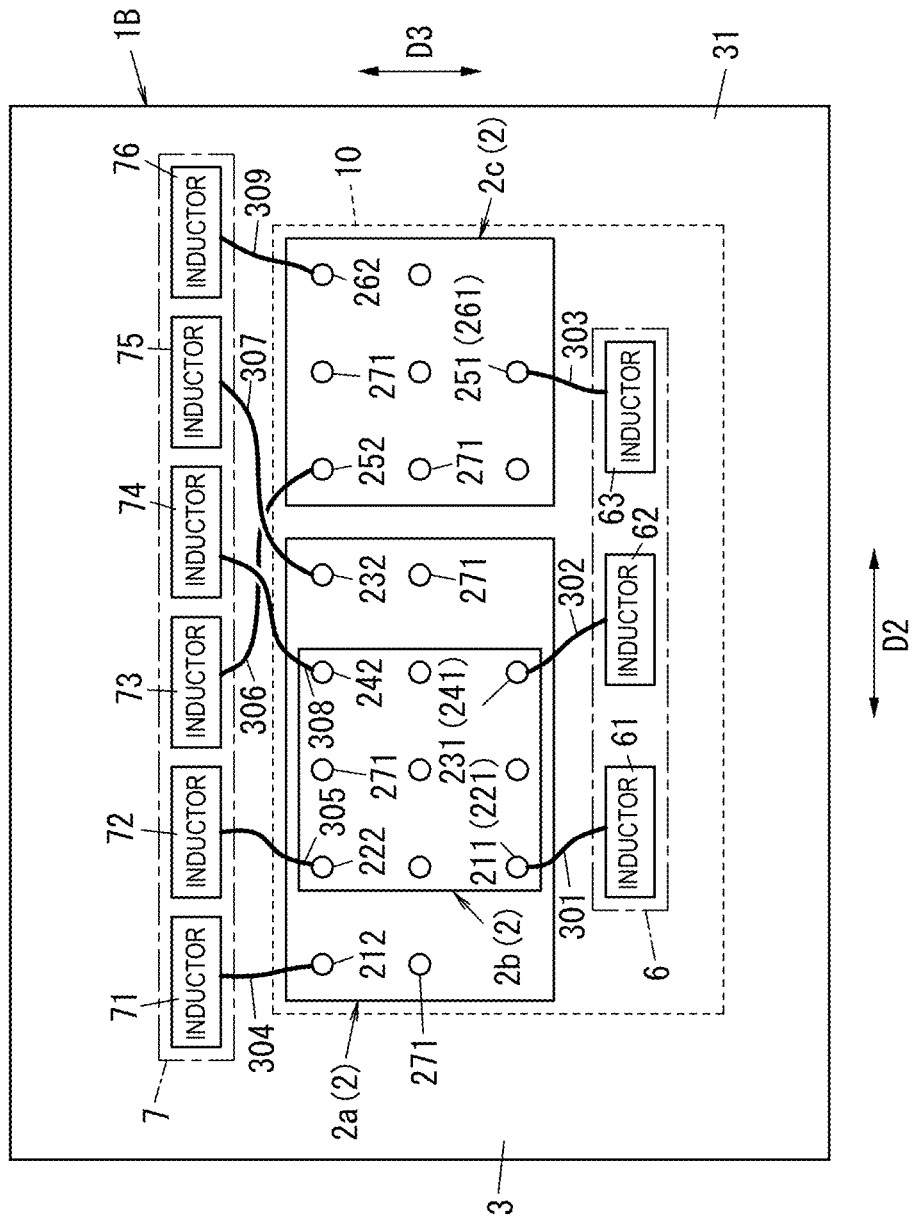
FIG. 5 is a plan view schematically illustrating a radio frequency module according to Modification 2 of Embodiment 1.

Here, the external dimensions of the first filter unit 2a are larger than the external dimensions of the second filter unit 2b in FIG. 5, but the external dimensions of the first filter unit 2a may be the same as or smaller than the external dimensions of the second filter unit 2b.

In the radio frequency module 1B according to Modification 2, in a plan view in the first direction D1, the first input terminal 211 of the first filter 21 is positioned at the first matching circuit 6 side end portion of the first filter 21 (first filter unit 2a), and the second input terminal 221 of the second filter 22 is positioned at the first matching circuit 6 side end portion of the second filter 22 (second filter unit 2b). In the radio frequency module 1A, in a plan view in the first direction D1, the third input terminal 231 of the third filter 23 is positioned at the first matching circuit 6 side end portion of the third filter 23 (first filter unit 2a), and the fourth input terminal 241 of the fourth filter 24 is positioned at the first matching circuit 6 side end portion of the fourth filter 24 (second filter unit 2b). In the radio frequency module 1A, in a plan view in the first direction D1, the fifth input terminal 251 of the fifth filter 25 is positioned at the first matching circuit 6 side end portion of the fifth filter 25 (third filter unit 2c), and the sixth input terminal 261 of the sixth filter 26 is positioned at the first matching circuit 6 side end portion of the sixth filter 26 (third filter unit 2c). Accordingly, it is possible to shorten the conductor patterns 301 to 303 connecting between the first input terminal 211 to the sixth input terminal 261 and the first matching circuit 6.

In the radio frequency module 1A according to Modification 1, in a plan view in the first direction D1, the first output terminal 212 of the first filter 21 is positioned at the second matching circuit 7 side end portion of the first filter 21 (first filter unit 2a), and the second output terminal 222 of the second filter 22 is positioned at the second matching circuit 7 side end portion of the second filter 22 (second filter unit 2b). In the radio frequency module 1A, in a plan view in the first direction D1, the third output terminal 232 of the third filter 23 is positioned at the second matching circuit 7 side end portion of the third filter 23 (first filter unit 2a), and the fourth output terminal 242 of the fourth filter 24 is positioned at the second matching circuit 7 side end portion of the fourth filter 24 (second filter unit 2b). In the radio frequency module 1A, in a plan view in the first direction D1, the fifth output terminal 252 of the fifth filter 25 is positioned at the second matching circuit 7 side end portion of the fifth filter 25 (third filter unit 2c), and the sixth output terminal 262 of the sixth filter 26 is positioned at the second matching circuit 7 side end portion of the sixth filter 26 (third filter unit 2c). Accordingly, it is possible to shorten the conductor patterns 304 to 309 connecting the first output terminal 212 to the sixth output terminal 262 and the second matching circuit 7.

(5.3) Modification 3

A radio frequency module 1C according to Modification 3 will be described with reference to FIG. 6.

In the radio frequency module 1 according to Embodiment 1, the second resin layer 12 is provided in the second main surface 32 side of the mounting substrate 3 so as to cover the switch IC 10 mounted on the second main surface 32 as illustrated in FIG. 1. Further, the radio frequency module 1 includes the plurality of external connection electrodes 9 formed in a columnar shape, and is connected to the mother substrate with the plurality of external connection electrodes 9.

Figure 6:
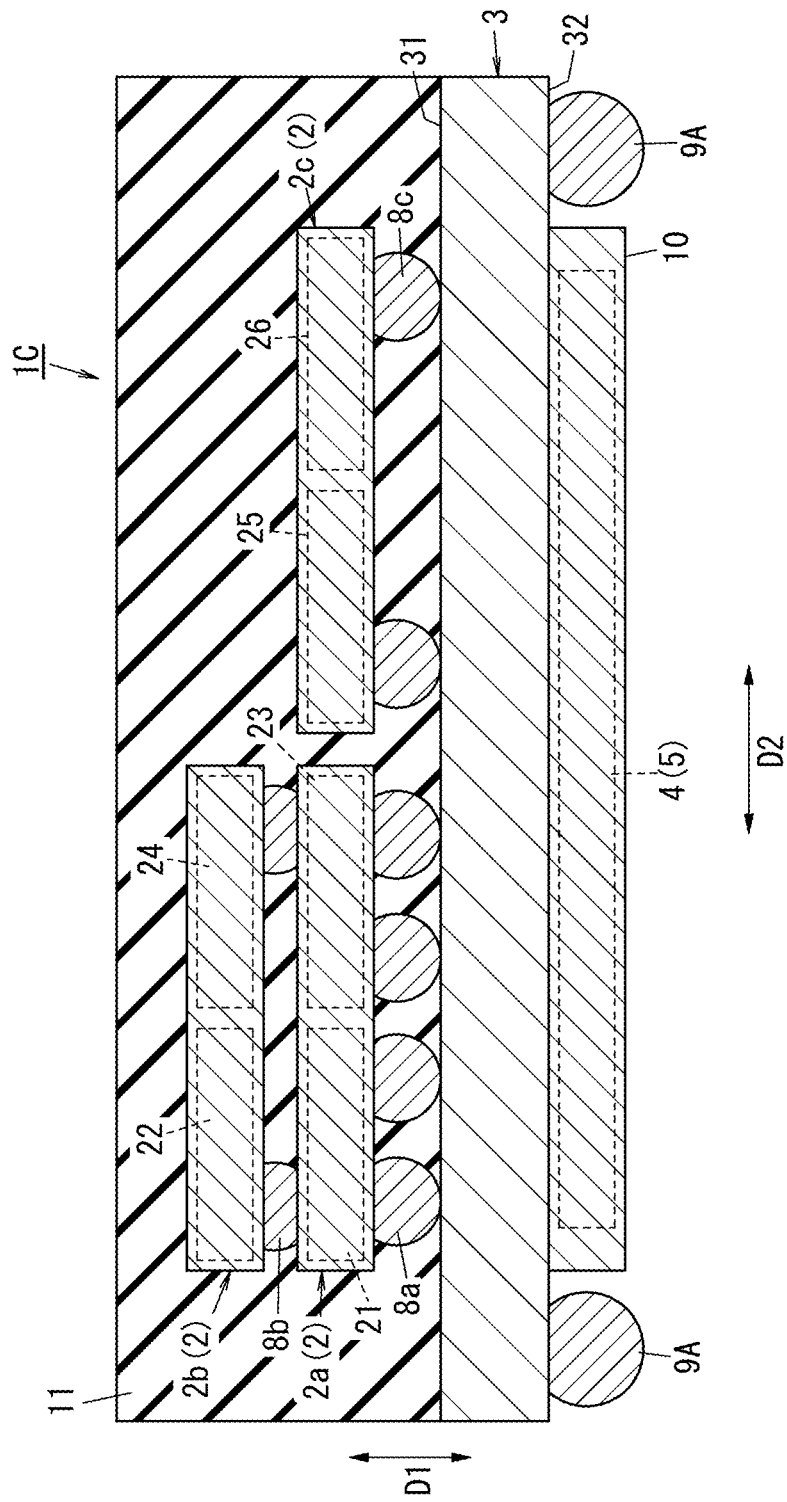
FIG. 6 is a sectional view schematically illustrating a radio frequency module according to Modification 3 of Embodiment 1.

Whereas, the second resin layer in the second main surface 32 side of the mounting substrate 3 may be omitted, and the radio frequency module 1C may be connected to the mother substrate with a plurality of external connection electrodes 9A formed in a spherical shape as in the radio frequency module 1C illustrated in FIG. 6.

Each of the plurality of external connection electrodes 9A is a ball bump formed in a spherical shape, for example. The material of the ball bump is gold, copper, solder, or the like, for example.

(5.4) Other Modifications

Hereinafter, other modifications of Embodiment 1 will be enumerated.

The low-noise amplifier 4 and the antenna switch 5 are formed in a single chip as the switch IC 10 in Embodiment 1, but the low-noise amplifier 4 and the antenna switch 5 may not be formed in a single chip. That is, the low-noise amplifier 4 and the antenna switch 5 may separately be mounted (disposed) on the second main surface 32 of the mounting substrate 3.

Another filter is constituted by the fifth filter 25 and the sixth filter 26 in Embodiment 1, but another filter may be constituted by at least one filter. That is, another filter may be constituted by only the fifth filter 25, only the sixth filter 26, or three or more filters including the fifth filter 25 and the sixth filter 26.

A footprint of the low-noise amplifier 4 overlaps part of the footprint of the first filter 21 and the footprint of the second filter 22 in a plan view in the first direction D1 in the Embodiment 1, but the footprint of the low-noise amplifier 4 may overlap the entire footprint of the first filter 21 and the entire footprint of the second filter 22. In other words, the footprint of the low-noise amplifier 4 may overlap at least part of the footprint of the first filter 21 and the footprint of the second filter 22 in a plan view in the first direction D1.

The acoustic wave resonator constituting the first filter 21 to the sixth filter 26 is the SAW resonator in Embodiment 1, but the acoustic wave resonator is not limited to the SAW resonator. The acoustic wave resonator may be a first acoustic wave resonator, for example. The first acoustic wave resonator includes a substrate having a front surface and a back surface, a low-acoustic-velocity film provided on the surface of the substrate, a piezoelectric body layer provided on the low-acoustic-velocity film, and an IDT electrode provided on the piezoelectric body layer. The low-acoustic-velocity film is provided directly or indirectly on the substrate. The piezoelectric body layer is directly or indirectly provided on the low-acoustic-velocity film. The acoustic velocity of a bulk wave propagating in the low-acoustic-velocity film is lower than the acoustic velocity of an acoustic wave propagating in the piezoelectric body layer. The acoustic velocity of the bulk wave propagating in the substrate is higher than the acoustic velocity of the acoustic wave propagating in the piezoelectric body layer. The material of the piezoelectric body layer is lithium tantalate, for example. The material of the low-acoustic-velocity film is silicon oxide, for example. The substrate is a silicon substrate, for example. The thickness of the piezoelectric body layer is $3.5\lambda$ or less in the case in which $\lambda$ is the wavelength of the acoustic wave determined by the electrode finger period of the IDT electrode, for example. The thickness of the low-acoustic-velocity film is $2.0\lambda$ or less, for example. Further, the acoustic wave resonator may be a BAW resonator, for example.

Embodiment 2

Hereinafter, a radio frequency module 1D according to Embodiment 2 will be described with reference to FIG. 7.

In Embodiment 1, Modification 1, and Modification 2, the low-noise amplifier 4 and the antenna switch 5 are formed in a single chip, and are mounted on the second main surface 32 of the mounting substrate 3. Whereas, in the radio frequency module 1D according to Embodiment 2, the low-noise amplifier 4 and the antenna switch 5 are separately mounted (disposed) on the first main surface 31. Other configurations are the same as those of the radio frequency module 1 according to Embodiment 1, and a detailed description thereof will be omitted here.

Figure 7:
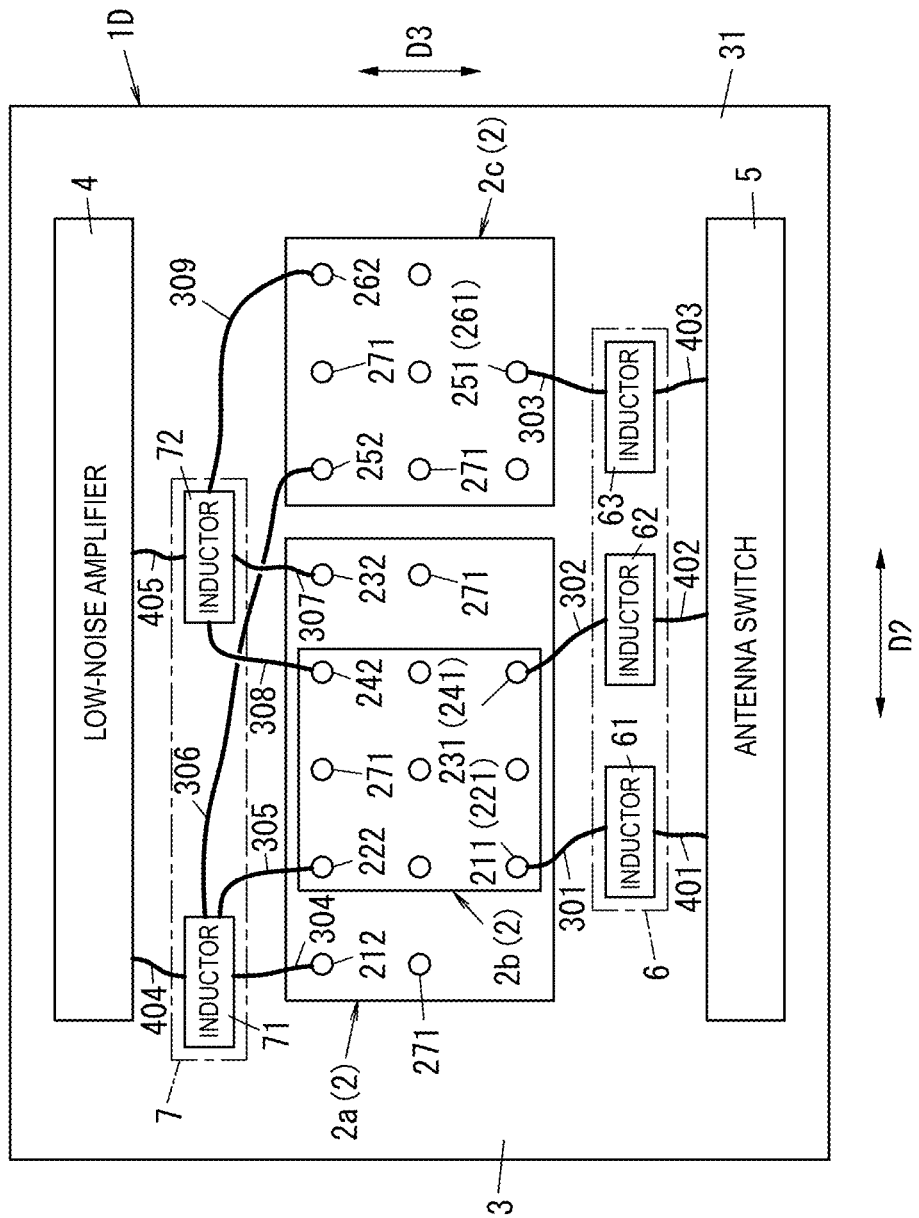
FIG. 7 is a plan view schematically illustrating a radio frequency module according to Embodiment 2.

FIG. 7 is a plan view of the mounting substrate 3 on which the filter unit 2 and the like are mounted when viewed from the first main surface 31 side. The external dimensions of the first filter unit 2a are larger than the external dimensions of the second filter unit 2b in FIG. 7, but the external dimensions of the first filter unit 2a may be the same as or smaller than the external dimensions of the second filter unit 2b.

The first filter unit 2a, the second filter unit 2b, the third filter unit 2c, the first matching circuit 6, and the second matching circuit 7 are mounted on the first main surface 31 of the mounting substrate 3. Further, the low-noise amplifier 4 and the antenna switch 5 are mounted on the first main surface 31 of the mounting substrate 3.

The first filter unit 2a and the second filter unit 2b are mounted on the first main surface 31 in a state of being stacked from the first main surface 31 side in the order of the first filter unit 2a and the second filter unit 2b in the first direction D1. The first direction D1 is the thickness direction of the mounting substrate 3.

The third filter unit 2c is mounted on the first main surface 31 in a state of being adjacent to the first filter unit 2a and the second filter unit 2b in the second direction D2. The second direction D2 is the direction orthogonal to the first direction D1. That is, in the radio frequency module 1C according to Embodiment 2, each of the fifth filter 25 and the sixth filter 26 included in the third filter unit 2c is another filter.

The low-noise amplifier 4 is provided on one end side (upper side in FIG. 7) of the first filter unit 2a, the second filter unit 2b, and the third filter unit 2c in the third direction D3. The third direction D3 is orthogonal to both the first direction D1 and the second direction D2. The antenna switch 5 is provided on the other end side (lower side in FIG. 7) of the first filter unit 2a, the second filter unit 2b, and the third filter unit 2c in the third direction D3. That is, the first filter unit 2a, the second filter unit 2b, and the third filter unit 2c are disposed between the low-noise amplifier 4 and the antenna switch 5 in a plan view in the first direction D1.

The first matching circuit 6 is disposed between the antenna switch 5 and the first filter unit 2a, the second filter unit 2b, and the third filter unit 2c in a plan view in the first direction D1. Further, the first matching circuit 6 is adjacent to the first filter unit 2a, the second filter unit 2b, and the third filter unit 2c in a plan view in the first direction D1.

The inductor 61 of the first matching circuit 6 is connected to the antenna switch 5 via a conductor pattern 401 formed on the first main surface 31 of the mounting substrate 3. The inductor 62 of the first matching circuit 6 is connected to the antenna switch 5 via a conductor pattern 402 formed on the first main surface 31 of the mounting substrate 3. The inductor 63 of the first matching circuit 6 is connected to the antenna switch 5 via a conductor pattern 403 formed on the first main surface 31 of the mounting substrate 3.

In the radio frequency module 1D, in a plan view in the first direction D1, the first input terminal 211 of the first filter 21 is positioned at the first matching circuit 6 side end portion of the first filter 21 (first filter unit 2a), and the second input terminal 221 of the second filter 22 is positioned at the first matching circuit 6 side end portion of the second filter 22 (second filter unit 2b). That is, in the radio frequency module 1D, in a plan view in the first direction D1, the first input terminal 211 of the first filter 21 is positioned at the antenna switch 5 side end portion of the first filter 21, and the second input terminal 221 of the second filter 22 is positioned at the antenna switch 5 side end portion of the second filter 22.

In the radio frequency module 1D, in a plan view in the first direction D1, the third input terminal 231 of the third filter 23 is positioned at the first matching circuit 6 side end portion of the third filter 23 (first filter unit 2a), and the fourth input terminal 241 of the fourth filter 24 is positioned at the first matching circuit 6 side end portion of the fourth filter 24 (second filter unit 2b). That is, in the radio frequency module 1D, in a plan view in the first direction D1, the third input terminal 231 of the third filter 23 is positioned at the antenna switch 5 side end portion of the third filter 23, and the fourth input terminal 241 of the fourth filter 24 is positioned at the antenna switch 5 side end portion of the fourth filter 24.

In the radio frequency module 1D, in a plan view in the first direction D1, the fifth input terminal 251 of the fifth filter 25 is positioned at the first matching circuit 6 side end portion of the fifth filter 25 (third filter unit 2c), and the sixth input terminal 261 of the sixth filter 26 is positioned at the first matching circuit 6 side end portion of the sixth filter 26 (third filter unit 2c). That is, in the radio frequency module 1D, in a plan view in the first direction D1, the fifth input terminal 251 of the fifth filter 25 is positioned at the antenna switch 5 side end portion of the fifth filter 25, and the sixth input terminal 261 of the sixth filter 26 is positioned at the antenna switch 5 side end portion of the sixth filter 26.

These configurations make it possible to shorten the conductor patterns 301 to 303 connecting between the first input terminal 211 to the sixth input terminal 261 and the first matching circuit 6. Further, it is possible to shorten the conductor patterns 401 to 403 connecting between the first matching circuit 6 and the antenna switch 5.

The second matching circuit 7 is disposed between the low-noise amplifier 4 and the first filter unit 2a, the second filter unit 2b, and the third filter unit 2c in a plan view in the first direction D1. Further, the second matching circuit 7 is adjacent to the first filter unit 2a, the second filter unit 2b, and the third filter unit 2c in a plan view in the first direction D1.

The inductor 71 of the second matching circuit 7 is connected to the low-noise amplifier 4 via a conductor pattern 404 formed on the first main surface 31 of the mounting substrate 3. Further, the inductor 72 of the second matching circuit 7 is connected to the low-noise amplifier 4 via a conductor pattern 405 formed on the first main surface 31 of the mounting substrate 3.

In the radio frequency module 1D, in a plan view in the first direction D1, the first output terminal 212 of the first filter 21 is positioned at the second matching circuit 7 side end portion of the first filter 21 (first filter unit 2a), and the second output terminal 222 of the second filter 22 is positioned at the second matching circuit 7 side end portion of the second filter 22 (second filter unit 2b). That is, in the radio frequency module 1D, in a plan view in the first direction D1, the first output terminal 212 of the first filter 21 is positioned at the low-noise amplifier 4 side end portion of the first filter 21, and the second output terminal 222 of the second filter 22 is positioned at the low-noise amplifier 4 side end portion of the second filter 22.

In the radio frequency module 1D, in a plan view in the first direction D1, the third output terminal 232 of the third filter 23 is positioned at the second matching circuit 7 side end portion of the third filter 23 (first filter unit 2a), and the fourth output terminal 242 of the fourth filter 24 is positioned at the second matching circuit 7 side end portion of the fourth filter 24 (second filter unit 2b). That is, in the radio frequency module 1D, in a plan view in the first direction D1, the third output terminal 232 of the third filter 23 is positioned at the low-noise amplifier 4 side end portion of the third filter 23, and the fourth output terminal 242 of the fourth filter 24 is positioned at the low-noise amplifier 4 side end portion of the fourth filter 24.

In the radio frequency module 1D, in a plan view in the first direction D1, the fifth output terminal 252 of the fifth filter 25 is positioned at the second matching circuit 7 side end portion of the fifth filter 25 (third filter unit 2c), and the sixth output terminal 262 of the sixth filter 26 is positioned at the second matching circuit 7 side end portion of the sixth filter 26 (third filter unit 2c). That is, in the radio frequency module 1D, in a plan view in the first direction D1, the fifth output terminal 252 of the fifth filter 25 is positioned at the low-noise amplifier 4 side end portion of the fifth filter 25, and the sixth output terminal 262 of the sixth filter 26 is positioned at the low-noise amplifier 4 side end portion of the sixth filter 26.

These configurations make it possible to shorten the conductor patterns 301 to 309 connecting between the first output terminal 212 to the sixth output terminal 262 and the second matching circuit 7. Further, it is possible to shorten the conductor patterns 404 and 405 connecting between the second matching circuit 7 and the low-noise amplifier 4.

In the radio frequency module 1D, the first filter 21 (first filter unit 2a) is provided on the first main surface 31 of the mounting substrate 3, and further, the second filter 22 (second filter unit 2b) is stacked on the first filter 21. That is, the first filter 21 and the second filter 22 connected to the same low-noise amplifier 4 are stacked on the mounting substrate 3. This makes it possible to reduce the mounting substrate 3 in size compared with the case in which the first filter 21 and the second filter 22 are separately disposed on the first main surface 31 of the mounting substrate 3. Further, since the radio frequency module 1D includes this mounting substrate 3, the radio frequency module 1D may also be reduced in size.

Embodiment 3

Hereinafter, a radio frequency module 1E according to Embodiment 3 will be described with reference to FIG. 8.

In Embodiment 1, Modification 1, Modification 2, and Embodiment 2, the third filter unit 2c including the fifth filter 25 and the sixth filter 26 constituting another filter is mounted on the first main surface 31 of the mounting substrate 3. Whereas, the third filter unit 2c may be mounted on the second main surface 32 of the mounting substrate 3 as illustrated in FIG. 8. Other configurations are the same as those of the radio frequency module 1 according to Embodiment 1, and a detailed description thereof will be omitted here.

Figure 8:
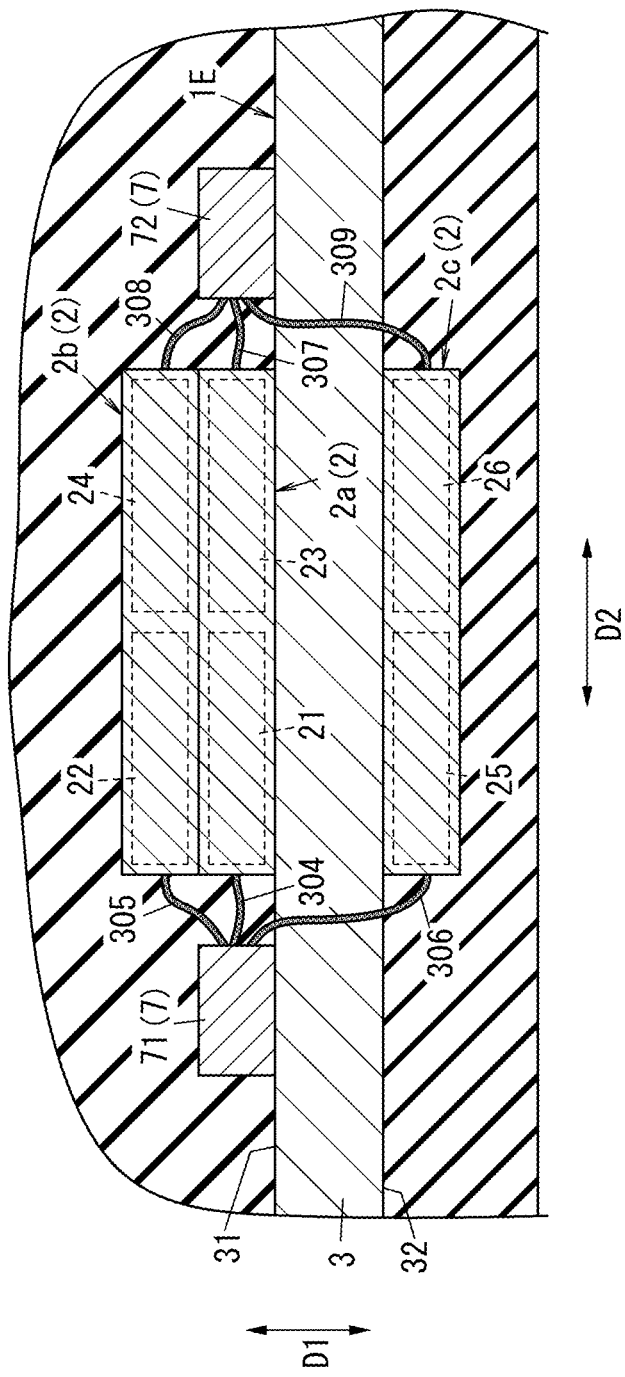
FIG. 8 is a sectional view schematically illustrating a radio frequency module according to Embodiment 3.

FIG. 8 is a sectional view of the mounting substrate 3 on which the filter unit 2 and the like are mounted. The first filter unit 2a, the second filter unit 2b, and the second matching circuit 7 are mounted on the first main surface 31 of the mounting substrate 3. Note that the low-noise amplifier 4, the antenna switch 5, and the second matching circuit 7 are not illustrated in FIG. 8.

The first filter unit 2a and the second filter unit 2b are stacked from the first main surface 31 side in the order of the first filter unit 2a and the second filter unit 2b in the first direction D1. The first direction D1 is the thickness direction of the mounting substrate 3. The inductors 71 and 72 of the second matching circuit 7 are positioned in both sides of the first filter unit 2a and the second filter unit 2b in the second direction D2. The second direction D2 is the direction orthogonal to the first direction D1.

The third filter unit 2c is mounted on the second main surface 32 of the mounting substrate 3. A footprint of the third filter unit 2c overlaps at least part of the footprint of the first filter unit 2a and the footprint of the second filter unit 2b in a plan view in the first direction D1. The footprint of the third filter unit 2c overlaps the entire footprint of the first filter unit 2a and the entire footprint of the second filter unit 2b in a plan view in the first direction D1 in FIG. 8. In the present embodiment, each of the fifth filter 25 and the sixth filter 26 included in the third filter unit 2c is another filter.

In the radio frequency module 1E according to the present embodiment, the second matching circuit 7 is adjacent to the first filter unit 2a and the second filter unit 2b. This makes it possible to shorten the conductor patterns 304, 305, 307, and 308 connecting between the output terminals of the first filter 21 to the fourth filter 24 and the second matching circuit 7.

Further, in the radio frequency module 1E according to the present embodiment, the footprint of the third filter unit 2c overlaps the entire footprint of the first filter unit 2a and the entire footprint of the second filter unit 2b in a plan view in the first direction D1. This makes it possible to shorten at least one of the conductor pattern 306 and the conductor pattern 309 compared with the case in which the footprint of the third filter unit 2c does not overlap the footprint of the first filter unit 2a or the footprint of the second filter unit 2b. The conductor pattern 306 is the conductor pattern connecting the output terminal of the fifth filter 25 and the inductor 71 of the second matching circuit 7. The conductor pattern 309 is the conductor pattern connecting the output terminal of the sixth filter 26 and the inductor 72 of the second matching circuit 7.

In the radio frequency module 1E, the first filter 21 (first filter unit 2a) is provided on the first main surface 31 of the mounting substrate 3, and further, the second filter 22 (second filter unit 2b) is stacked on the first filter 21. That is, the first filter 21 and the second filter 22 connected to the same low-noise amplifier 4 are stacked on the mounting substrate 3. This makes it possible to reduce the mounting substrate 3 in size compared with the case in which the first filter 21 and the second filter 22 are separately disposed on the first main surface 31 of the mounting substrate 3. Further, since the radio frequency module 1E includes this mounting substrate 3, the radio frequency module 1E may also be reduced in size.

SUMMARY

The following aspects have been disclosed in the embodiments and the like described above.

The radio frequency module (1; 1A; 1B; 1C; 1D) according to the first aspect includes a mounting substrate (3), a first filter (21), a second filter (22), and a low-noise amplifier (4). The mounting substrate (3) has a first main surface (31) and a second main surface (32) on opposite sides of the mounting substrate (3). The first filter (21) allows a first receiving signal in a first frequency band to pass through. The second filter (22) allows a second receiving signal in a second frequency band different from the first frequency band to pass through. The low-noise amplifier (4) is connected to the first filter (21) and the second filter (22), and is provided on the first main surface (31) or on the second main surface (32). The first filter (21) is provided on the first main surface (31). The second filter (22) is stacked on the first filter (21).

According to this aspect, it is possible to reduce the mounting substrate (3) in size compared with the case in which the first filter (21) and the second filter (22) are separately provided on the first main surface (31) of the mounting substrate (3).

In the radio frequency module (1; 1A; 1B) according to a second aspect, the low-noise amplifier (4) is provided on the second main surface (32) in the first aspect.

According to this aspect, it is possible to reduce the mounting substrate (3) in size compared with the case in which the low-noise amplifier (4) is provided on the first main surface (31).

In the radio frequency module (1; 1A; 1B) according to a third aspect, a footprint of the low-noise amplifier (4) overlaps at least part of a footprint of the first filter (21) and a footprint of the second filter (22) in a plan view in a thickness direction (D1) of the mounting substrate (3) in the second aspect.

According to this aspect, it is possible to shorten a path (wiring length) between the first filter (21) and the low-noise amplifier (4) and between the second filter (22) and the low-noise amplifier (4).

The radio frequency module (1C) according to a fourth aspect further includes an antenna switch (5) in the second or the third aspect. The antenna switch (5) is connected to the first filter (21) and the second filter (22). The antenna switch (5) is provided on the first main surface (31) or on the second main surface (32). The first filter (21) and the second filter (22) are disposed between the low-noise amplifier (4) and the antenna switch (5) in a plan view in the thickness direction (D1).

According to this aspect, it is possible to shorten the path (wiring length) between the first filter (21) and the antenna switch (5) and between the second filter (22) and the antenna switch (5).

In the radio frequency module (1C) according to a fifth aspect, the first filter (21) has a first output terminal (212) to output a first receiving signal in the fourth aspect. The second filter (22) has a second output terminal (222) to output a second receiving signal. The first output terminal (212) is positioned at an end portion of the first filter (21) on a side of the low-noise amplifier (4) in a plan view in the thickness direction (D1). The second output terminal (222) is positioned at an end portion of the second filter (22) on a side of the low-noise amplifier (4) in a plan view in the thickness direction (D1).

According to this aspect, it is possible to further shorten the path (wiring length) between the first filter (21) and the low-noise amplifier (4) and between the second filter (22) and the low-noise amplifier (4).

In the radio frequency module (1C) according to a sixth aspect, the first filter (21) has a first input terminal (211) to which the first receiving signal is inputted in the fourth or fifth aspect. The second filter (22) has a second input terminal (221) to which the second receiving signal is inputted. The first input terminal (211) is positioned at an end portion of the first filter (21) on a side of the antenna switch (5) in a plan view in the thickness direction (D1). The second input terminal (221) is positioned at an end portion of the second filter (22) on a side of the antenna switch (5) in a plan view in the thickness direction (D1).

According to this aspect, it is possible to further reduce the wiring length between the first filter (21) and the antenna switch (5) and between the second filter (22) and the antenna switch (5).

The radio frequency module (1C) according to a seventh aspect further includes a matching circuit (7) in the fifth or sixth aspect. The matching circuit (7) is connected between the first filter (21) and the low-noise amplifier (4) and between the second filter (22) and the low-noise amplifier (4). The matching circuit (7) is provided on the first main surface (31) between the first filter (21) and the low-noise amplifier (4) and between the second filter (22) and the low-noise amplifier (4) in a state of being adjacent to the first filter (21) and the second filter (22) in a plan view in the thickness direction (D1). The first output terminal (212) is positioned at an end portion of the first filter (21) on a side of the matching circuit (7) in a plan view in the thickness direction (D1). The second output terminal (222) is positioned at an end portion of the second filter (22) on a side of the matching circuit (7) in a plan view in the thickness direction (D1).

According to this aspect, it is possible to shorten the path (wiring length) between the first filter (21) and the matching circuit (7) and between the second filter (22) and the matching circuit (7).

The radio frequency module (1C) according to an eighth aspect further includes a first matching circuit (6) in the seventh aspect. The first matching circuit (6) is connected between the first filter (21) and the antenna switch (5) and between the second filter (22) and the antenna switch (5). The first matching circuit (6) is different from a second matching circuit (7) as the matching circuit (7). The first matching circuit (6) is provided on the first main surface (31) between the first filter (21) and the antenna switch (5) and between the second filter (22) and the antenna switch (5) in a state of being adjacent to the first filter (21) and the second filter (22) in a plan view in the thickness direction (D1). The first input terminal (211) is positioned at an end portion of the first filter (21) on a side of the first matching circuit (6) in a plan view in the thickness direction (D1). The second input terminal (221) is positioned at an end portion of the second filter (22) on a side of the first matching circuit (6) in a plan view in the thickness direction (D1).

According to this aspect, it is possible to shorten the path (wiring length) between the first filter (21) and the first matching circuit (6) and between the second filter (22) and the first matching circuit (6).

In the radio frequency module (1; 1B; 1C) according to a ninth aspect, the first filter (21) includes a first input terminal (211) to which the first receiving signal is inputted and a first output terminal (212) from which the first receiving signal is outputted, in any one of the first to eighth aspects. The second filter (22) includes a second input terminal (221) to which the second receiving signal is inputted, and a second output terminal (222) from which the second receiving signal is outputted. A first signal terminal is either of the first input terminal (211) or the first output terminal (212), and a second signal terminal is either of the second input terminal (221) or the second output terminal (222). In the case in which the first signal terminal is the first input terminal (211), the second signal terminal is the second input terminal (221). In the case in which the first signal terminal is the first output terminal (212), the second signal terminal is the second output terminal (222). In the radio frequency module (1; 1B; 1C), the first signal terminal and the mounting substrate (3) are connected via a first external connection terminal (8a), and the second signal terminal and the mounting substrate (3) are connected via the first external connection terminal (8a), the first signal terminal, and a second external connection terminal (8b).

According to this aspect, it is possible to suppress deterioration in the filter characteristic of the first filter (21) and the second filter (22).

The radio frequency module (1; 1A; 1B; 1C; 1D) according to a tenth aspect further includes a third filter (23) in any one of the first to ninth aspects. The third filter (23) may be used for simultaneous communication together with the first filter (21). The third filter (23) is a filter different from the second filter (22).

According to this aspect, it is possible to suppress a decrease in isolation between the first filter (21) and the third filter (23).

In the radio frequency module (1; 1A; 1B; 1C; 1D) according to an eleventh aspect, the first filter (21) and the third filter (23) are arranged side by side in a direction (D2) orthogonal to the thickness direction (D1) in the tenth aspect.

According to this aspect, it is possible to suppress a decrease in isolation between the first filter (21) and the third filter (23).

The radio frequency module (1; 1A; 1B; 1C; 1D) according to a twelfth aspect further includes a fourth filter (24) in the tenth or eleventh aspect. The fourth filter (24) may be used for the simultaneous communication together with the second filter (22). The second filter (22) and the fourth filter (24) are arranged side by side in the direction (D2) orthogonal to the thickness direction (D1).

According to this aspect, it is possible to suppress a decrease in isolation between the second filter (22) and the fourth filter (24).

The radio frequency module (1; 1A; 1B; 1C; 1D) according to a thirteenth aspect further includes another filter (fifth filter 25 and sixth filter 26, for example) in any one of the tenth to twelfth aspects. Another filter is a filter different from the first filter (21), the second filter (22), and the third filter (23). Another filter is provided on the first main surface (31) in a state of being adjacent to the first filter (21) and the second filter (22).

According to this aspect, it is possible to reduce the mounting substrate (3) in size compared with the case in which another filter is arranged at positions away from the first filter (21) and the second filter (22).

The radio frequency module (1D) according to a fourteenth aspect further includes another filter (fifth filter 25 and sixth filter 26, for example), in any one of the tenth to twelfth aspects. Another filter is a filter different from the first filter (21), the second filter (22), and the third filter (23). Another filter is provided on the second main surface (32).

According to this aspect, it is possible to reduce the mounting substrate (3) in size compared with the case in which another filter is provided on the first main surface (31) side.

In the radio frequency module (1D) according to the fifteenth aspect, a footprint of another filter overlaps at least part of a footprint of the first filter (21) and a footprint of the second filter (22) in a plan view in the thickness direction (D1) in the fourteenth aspect.

According to this aspect, it is possible to shorten the path (wiring length) between another filter and an electronic component (second matching circuit 7, for example) to which the first filter (21) and the second filter (22) are connected.

A communication device (200) according to a sixteenth aspect includes the radio frequency module (1) according to any one of the first to fifteenth aspects and a signal processing circuit (202). The signal processing circuit (202) processes the first receiving signal and the second receiving signal.

According to this aspect, it is possible to reduce the mounting substrate (3) in size compared with the case in which the first filter (21) and the second filter (22) are separately provided on the first main surface (31).

REFERENCE SIGNS LIST 1, 1A, 1B, 1C, 1D Radio Frequency Module
3 Mounting Substrate
4 Low-Noise Amplifier
5 Antenna Switch
6 First Matching Circuit
7 Second Matching Circuit (Matching Circuit)
8a External Connection Terminal (First External Connection Terminal)
8b External Connection Terminal (Second External Connection Terminal)
21 First Filter
22 Second Filter
23 Third Filter
24 Fourth Filter
25 Fifth Filter (Another Filter)
26 Sixth Filter (Another Filter)
31 First Main Surface
32 Second Main Surface
200 Communication Device
202 Signal Processing Circuit
211 First Input Terminal
212 First Output Terminal
221 Second Input Terminal
222 Second Output Terminal
D1 First Direction (Thickness Direction)
D2 Second Direction

The invention claimed is:

1. A radio frequency module, comprising:
a mounting substrate having a first main surface and a second main surface that are on opposite sides of the mounting substrate;
a first filter provided on the first main surface, the first filter configured to allow a first receiving signal in a first frequency band to pass through;
a second filter stacked on the first filter, the second filter configured to allow a second receiving signal in a second frequency band different from the first frequency band to pass through; and
a low-noise amplifier connected to the first filter and the second filter and provided on the second main surface.

2. The radio frequency module of claim 1, wherein a footprint of the low-noise amplifier overlaps at least part of a footprint of the first filter and a footprint of the second filter in a plan view in a thickness direction of the mounting substrate.

3. The radio frequency module of claim 1, further comprising:
an antenna switch connected to the first filter and the second filter and provided on the first main surface or on the second main surface.

4. The radio frequency module of claim 3, wherein the first filter and the second filter are disposed between the low-noise amplifier and the antenna switch in a plan view in a thickness direction of the module substrate.

5. The radio frequency module of claim 4, wherein
the first filter has a first output terminal to output the first receiving signal,
the second filter has a second output terminal to output the second receiving signal,
the first output terminal is positioned at an end portion of the first filter on a side of the low-noise amplifier in the plan view in the thickness direction, and
the second output terminal is positioned at an end portion of the second filter on a side of the low-noise amplifier in the plan view in the thickness direction.

6. The radio frequency module of claim 5, further comprising:
a matching circuit connected between the first filter and the low-noise amplifier and between the second filter and the low-noise amplifier, wherein
the matching circuit is provided on the first main surface between the first filter and the low-noise amplifier and between the second filter and the low-noise amplifier in a state of being adjacent to the first filter and the second filter in the plan view in the thickness direction,
the first output terminal is positioned at an end portion of the first filter on a side of the matching circuit in the plan view in the thickness direction, and
the second output terminal is positioned at an end portion of the second filter on a side of the matching circuit in the plan view in the thickness direction.

7. The radio frequency module of claim 6, further comprising:
a first matching circuit connected between the first filter and the antenna switch and between the second filter and the antenna switch and differing from a second matching circuit as the matching circuit, wherein
the first matching circuit is provided on the first main surface between the first filter and the antenna switch and between the second filter and the antenna switch in a state of being adjacent to the first filter and the second filter in the plan view in the thickness direction,
the first input terminal is positioned at an end portion of the first filter on a side of the first matching circuit in the plan view in the thickness direction, and
the second input terminal is positioned at an end portion of the second filter on a side of the first matching circuit in the plan view in the thickness direction.

8. The radio frequency module of claim 4, wherein
the first filter has a first input terminal to which the first receiving signal is input,
the second filter has a second input terminal to which the second receiving signal is input,
the first input terminal is positioned at an end portion of the first filter on a side of the antenna switch in the plan view in the thickness direction, and
the second input terminal is positioned at an end portion of the second filter on a side of the antenna switch in the plan view in the thickness direction.

9. The radio frequency module of claim 1, wherein
the first filter includes
a first input terminal to which the first receiving signal is input, and
a first output terminal to output the first receiving signal,
the second filter includes a second input terminal to which the second receiving signal is input, and a second output terminal to output the second receiving signal, a second signal terminal, which is either of the second input terminal or the second output terminal, is the second input terminal in a case in which a first signal terminal, which is either of the first input terminal or the first output terminal, is the first input terminal, the second signal terminal is the second output terminal in a case in which the first signal terminal is the first output terminal, and the first signal terminal and the mounting substrate are connected via a first external connection terminal, and the second signal terminal and the mounting substrate are connected via the first external connection terminal, the first signal terminal, and a second external connection terminal.

10. The radio frequency module of claim 1, further comprising:
a third filter, which is different from the second filter, configured to be used for simultaneous communication together with the first filter.

11. The radio frequency module of claim 10, wherein the first filter and the third filter are arranged side by side in a direction orthogonal to a thickness direction of the module substrate.

12. The radio frequency module of claim 10, further comprising:
a fourth filter configured to be used for simultaneous communication together with the second filter, wherein the second filter and the fourth filter are arranged side by side in a direction orthogonal to a thickness direction of the module substrate.

13. The radio frequency module according to claim 10, further comprising:
another filter, which is different from the first filter, the second filter, and the third filter, wherein
the another filter is provided on the first main surface in a state of being adjacent to the first filter and the second filter.

14. The radio frequency module of claim 10, further comprising:
another filter, which is different from the first filter, the second filter, and the third filter, and is provided on the second main surface.

15. The radio frequency module of claim 14, wherein a footprint of the another filter overlaps at least part of a footprint of the first filter and a footprint of the second filter in a plan view in a thickness direction of the module substrate.

16. A communication device, comprising:
a radio frequency module including
a mounting substrate having a first main surface and a second main surface that are on opposite sides of the mounting substrate;
a first filter provided on the first main surface, the first filter configured to allow a first receiving signal in a first frequency band to pass through;
a second filter stacked on the first filter, the second filter configured to allow a second receiving signal in a second frequency band different from the first frequency band to pass through; and a low-noise amplifier connected to the first filter and the second filter and provided on the first main surface or on the second main surface; and a signal processing circuit to process the first receiving signal and the second receiving signal, wherein the first filter includes
a first input terminal to which the first receiving signal is input, and
a first output terminal to output the first receiving signal, the second filter includes
a second input terminal to which the second receiving signal is input, and
a second output terminal to output the second receiving signal, a second signal terminal, which is either of the second input terminal or the second output terminal, is the second input terminal in a case in which a first signal terminal, which is either of the first input terminal or the first output terminal, is the first input terminal, the second signal terminal is the second output terminal in a case in which the first signal terminal is the first output terminal, and the first signal terminal and the mounting substrate are connected via a first external connection terminal, and the second signal terminal and the mounting substrate are connected via the first external connection terminal, the first signal terminal, and a second external connection terminal.

17. A radio frequency module, comprising:
a mounting substrate having a first surface and a second surface that are on opposite sides of the mounting substrate;
a first passband filter provided on the first surface;
a second passband filter stacked on the first filter; and
a low-noise amplifier connected to the first passband filter and the second passband filter and provided on the second surface, wherein
a passband of the second passband filter is different from a passband of the first passband filter, and
a footprint of the low-noise amplifier at least partially overlaps a footprint of the first passband filter and a footprint of the second passband filter in a plan view of the mounting substrate.

18. The radio frequency module of claim 17, further comprising:
an antenna switch provided on the first surface or the second surface and connected to the first passband filter and the second passband filter, wherein
the first passband filter and the second passband filter are disposed between the low-noise amplifier and the antenna switch in a plan view in a thickness direction of the module substrate.

* * * * *